US012804652B2

(12) United States Patent
Wang

(10) Patent No.: US 12,804,652 B2
(45) Date of Patent: Nov. 17, 2026

(54) METHOD FOR DETERMINING SPS PDSCH, TERMINAL, ELECTRONIC DEVICE AND STORAGE MEDIUM

(71) Applicant: DATANG MOBILE COMMUNICATIONS EQUIPMENT CO., LTD., Beijing (CN)

(72) Inventor: Junwei Wang, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 285 days.

(21) Appl. No.: 18/690,780

(22) PCT Filed: Sep. 28, 2022

(86) PCT No.: PCT/CN2022/122328
§ 371 (c)(1),
(2) Date: Mar. 11, 2024

(87) PCT Pub. No.: WO2023/051647
PCT Pub. Date: Apr. 6, 2023

(65) Prior Publication Data

US 2024/0373423 A1 Nov. 7, 2024

(30) Foreign Application Priority Data

Sep. 30, 2021 (CN) .......................... 202111166044.8
Jan. 21, 2022 (CN) ........................ 202210073834.X

(51) Int. Cl.
*H04W 72/1273* (2023.01)
*H04W 72/11* (2023.01)
(Continued)

(52) U.S. Cl.
CPC ........ *H04W 72/1273* (2013.01); *H04W 72/11* (2023.01); *H04W 72/51* (2023.01); *H04W 72/566* (2023.01)

(58) Field of Classification Search
CPC . H04W 72/1273; H04W 72/04; H04W 72/11; H04W 72/23; H04W 72/51; H04W 72/566
See application file for complete search history.

(56) References Cited

U.S. PATENT DOCUMENTS 10,932,245 B2 * 2/2021 Hwang .................. H04W 4/06
2020/0162289 A1 5/2020 Ahn et al.
(Continued)

FOREIGN PATENT DOCUMENTS

CN 110637495 A 12/2019
CN 114650604 A 6/2022
(Continued)

OTHER PUBLICATIONS

Extended European search report issued Dec. 23, 2024 in European Application No. 22875030.3.
(Continued)

*Primary Examiner* — Wayne H Cai
(74) *Attorney, Agent, or Firm* — Harness, Dickey & Pierce, P.L.C.

(57) ABSTRACT

A method for determining SPS PDSCH, a terminal, an electronic device and a storage medium. The method includes: determining SPS PDSCHs activated by a base station in a slot, wherein the SPS PDSCHs include a first SPS PDSCH set of SPS PDSCHs for carrying unicast service, and/or a second SPS PDSCH set of SPS PDSCHs for carrying broadcast/multicast service; and determining SPS PDSCHs for transmitting or receiving data based on types of services carried by the activated SPS PDSCHs and a PDSCH reception capability supported by a terminal. The PDSCH reception capability supported by the terminal includes a capability of a supported frequency division multiplexing (FDM) mode determined by the terminal.

11 Claims, 4 Drawing Sheets

(51) Int. Cl.
*H04W 72/51* (2023.01)
*H04W 72/566* (2023.01)

(56) References Cited

U.S. PATENT DOCUMENTS

| | | | |
|---|---|---|---|
| 2021/0100013 | A1 | 4/2021 | Khoshnevisan et al. |
| 2022/0191882 | A1 | 6/2022 | Lee et al. |
| 2022/0377717 | A1 | 11/2022 | Park et al. |
| 2024/0348377 | A1* | 10/2024 | Wang .................... H04L 1/1861 |
| 2024/0349266 | A1* | 10/2024 | Zhang ................... H04L 1/1887 |

FOREIGN PATENT DOCUMENTS

| | | | |
|---|---|---|---|
| CN | 114760705 | A | 7/2022 |
| KR | 10-2020-0083217 | A | 7/2020 |
| WO | 2020/197338 | A1 | 10/2020 |

OTHER PUBLICATIONS

Vivo, "Discussion on mechanisms to improve reliability for RRC_CONNECTED UEs," 3GPP TSG RAN WG1 #105-e, R1-2104388, May 10, 2021.

International Search Report and Written Opinion issued Dec. 27, 2022 in International Application No. PCT/CN2022/122328.

Vivo, "Discussion on mechanisms to support group scheduling for RRC_CONNECTED Ues," 3GPP TSG RAN WG1 #105-e, R1-2104387, May 27, 2021.

* cited by examiner

METHOD FOR DETERMINING SPS PDSCH, TERMINAL, ELECTRONIC DEVICE AND STORAGE MEDIUM

CROSS-REFERENCE TO RELATED APPLICATIONS

This application is the U.S. national phase of PCT Application No. PCT/CN2022/122328 filed on Sep. 28, 2022, which claims a priority to Patent Application No. 2021111660448 filed in China National Intellectual Property Administration on Sep. 30, 2021, and claims a priority to patent application No. 202210073834X filed in China National Intellectual Property Administration on Jan. 21, 2022, the disclosures of each of which are incorporated herein by reference in their entireties.

TECHNICAL FIELD

The present application relates to the field of communications technology, and in particular, to a method for determining SPS PDSCH, a terminal, an electronic device and a storage medium.

BACKGROUND

Semi-persistent scheduling (Semi-Persistent Scheduling, SPS) is a new scheduling technology. In brief, a base station configures multiple SPS PDSCHs (SPS Physical Downlink Shared Channels) for a terminal in a certain slot, for use by the terminal. Since the SPS has the characteristics of "one allocation can be used for multiple times", the base station need not to transmit downlink control information (Downlink Control Information, DCI) to the terminal in each slot, thereby reducing the overhead of a corresponding physical downlink control channel (Physical Downlink Control Channel, PDCCH).

In a case that the terminal receives multiple SPS PDSCHs configured by the base station, the terminal needs to determine which SPS PDSCH or which SPS PDSCHs of multiple SPS PDSCHs may be used for data transmission and reception. At present, for a 5G network that adopts a time division multiplexing (Time Division Multiplexing, TDM) mode, a terminal may be enabled to receive two or more SPS PDSCHs in one slot. However, for a 5G network that adopts frequency-division multiplexing (Frequency-division multiplexing, FDM) mode, a terminal may be not enabled to receive two or more SPS PDSCHs in one slot. This may affect air interface resources and result in a poor user experience.

SUMMARY

Embodiments of the present application provide a method for determining SPS PDSCH, a terminal, an electronic device and a storage medium, which at least overcome or at least partially address the above issues.

In a first aspect, a method for determining SPS PDSCH is provided. The method includes: determining SPS PDSCHs activated by a base station in a slot, where the SPS PDSCHs include a first SPS PDSCH set of SPS PDSCHs for carrying unicast service, and/or a second SPS PDSCH set of SPS PDSCHs for carrying broadcast/multicast service; and determining, based on type of services carried by the activated SPS PDSCHs and a PDSCH reception capability supported by a terminal, SPS PDSCHs for transmitting or receiving data, where the PDSCH reception capability supported by the terminal includes a capability of a supported frequency division multiplexing (FDM) multiplexing mode determined by the terminal.

In a second aspect, a terminal is provided. The terminal includes: an activated resource determining module, configured to determine SPS PDSCHs activated by a base station in a slot, where the SPS PDSCHs include a first SPS PDSCH set of SPS PDSCHs for carrying unicast service, and/or a second SPS PDSCH set of SPS PDSCHs for carrying broadcast/multicast service; and a reception resource determining module, configured to determine SPS PDSCHs for transmitting or receiving data based on types of services carried by the activated SPS PDSCHs and a PDSCH reception capability supported by a terminal, where the PDSCH reception capability supported by the terminal includes a capability of a supported frequency division multiplexing (FDM) multiplexing mode determined by the terminal.

In a third aspect, an apparatus for determining semi-persistent scheduling physical downlink shared channel (SPS PDSCH) is provided. The apparatus includes a memory, a transceiver and a processor. The memory is configured to store a computer program. The transceiver is configured to transmit and/or receive data under the control of the processor. The processor is configured to read the computer program from the memory to execute steps of the method for determining SPS PDSCH in the first aspect.

In a fourth aspect, an embodiment of present application provides an electronic device. The electronic device includes a memory, a processor and a computer program that is stored in the memory and executable on the processor. The processor is configured to execute the program to implement steps of the method provided in the first aspect.

In a fifth aspect, an embodiment of present application provides a computer-readable storage medium, on which a computer program is stored. When the computer program is executed by a processor, steps of the method provided in the first aspect are implemented.

In a sixth aspect, an embodiment provides a computer program, including computer instructions. The computer instructions are stored in a computer-readable storage medium. When a processor of a computer device reads the computer instructions from the computer-readable storage medium, the processor is configured to execute the computer instructions to cause the computer device to perform steps of the method provided in the first aspect.

BRIEF DESCRIPTION OF THE DRAWINGS

In order to provide a clearer explanation of technical solutions in embodiments of present application, the accompanying drawings required in the description of the embodiments of present application will be introduced below in brief.

DETAILED DESCRIPTION

Figure 1:
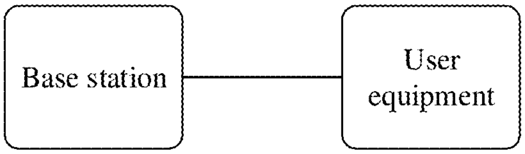
FIG. 1 is a schematic architecture diagram of a system according to an embodiment of the present application.

Embodiments of the present application are described in detail below, and examples of the embodiments are shown in the drawings, where the same or similar reference signs denote the same or similar elements or elements having the same or similar functions. The embodiments described below in combination with the drawings are exemplary only for explaining the present application, and are not construed as limiting the present application.

Those skilled in the art will understand that unless otherwise stated, singular forms "a", "an" and "the" used herein may also include plural forms. It should be further understood that the word "comprise" used in the description of the present application refers to the presence of a feature, integer, step, operation, element and/or component, but does not exclude the presence or addition of one or more other features, integers, steps, operations, elements, components and/or a combination thereof. It should be appreciated that when an element is "connected" or "coupled" to another element, it may be directly connected or coupled to the other element, an intervening element may also be present. Additionally, "connected" or "coupled" used herein may include wireless connection or wireless coupling. The expression "and/or" used herein includes all or any elements, and all combinations of one or more associated listed items.

In order to make object, technical solutions and advantages of the present application clearer, implementations of the present application will be further described in detail below in conjunction with the accompanying drawings.

First, several terms involved in present application will be introduced and explained.

1) Unicast (Unicast) service, refers to that reception and transmission of a data packet are performed only between two network nodes.
2) Multicast (Multicast) service, refers to that only members in a same group may receive a data packet. That is to say, when a destination address of a data packet transmitted by a node for sending data packet is a multicast address of the group, all nodes in the group will receive the transmitted content. In the embodiments of the present application, the multicast may also be a multicast service, a broadcast service, or a system broadcast message.
3) Broadcast/multicast service (also referred to as BCAST service) provides sky wave broadcast (sky wave broadcast) or auxiliary information to a mobile terminal. The broadcast/multicast service includes a broadcast service and a multicast service. For a broadcast service provided by a service provider, availability information is transmitted to each user who has subscribed to the service of the service provider. In addition, for a multicast service provided by the service provider, information is only transmitted to a certain group of users who have subscribed to a specific topic or content.

For broadcast/multicast service of 5G R17, an FDM mode supporting unicast PDSCH and broadcast/multicast PDSCH is discussed in the technical specification. Since the base station may configure multiple SPS PDSCHs for broadcast/multicast and unicast, and configuration periods for the multiple SPS PDSCHs may be different, it is possible to "aggregate N" SPS PDSCHs in some slot, and these N SPS PDSCHs exceed a reception capability of a user equipment (User Equipment, UE). For example, in one slot, there may be a case where the quantity of PDSCHs which are FDM-ed exceeds the reception capability of the UE, or the total quantity of PDSCHs exceeds the reception capability of the UE. In this case, the terminal and the base station need to determine which PDSCH(s) the terminal needs to receive by using a same approach.

In current 5G R16, for a multiplexing scenario of unicast TDM, the technical specification provides an approach in which the UE determines which PDSCHs to be received when there are multiple SPS PDSCHs (PDSCHs without PDCCH scheduling) in one slot. This approach may include Steps 0 to Step 3 as follows.

It should be noted that in this approach, there are following assumptions. set Q is a set of activated SPS PDSCHs in one slot. In the set Q, all SPS PDSCHs are configured with configuration indexes sps-ConfigIndex that are different from each other. In this approach, the SPS PDSCHs in the set Q are traversed based on the order of values of the SPS PDSCH configuration indexes sps-ConfigIndex from small to large. Before starting the traversing, a traverse parameter j may be set (that is, the quantity of PDSCHs that have been selected and have been demodulated by the UE, and the traversal parameter may also be referred to as the quantity of iterations) to be 0; a maximum quantity of SPS PDSCHs that the UE supports to receive in one slot is M.

Step 0: setting j=0, where j is the quantity of SPS PDSCHs that the UE have selected and demodulated.

Step 1: selecting, by the UE from the set Q, an SPS PDSCH whose SPS PDSCH configuration index sps-ConfigIndex has the smallest value, setting j=j+1, and recording the selected SPS PDSCH as a survivor PDSCH. The survivor PDSCH refers to a PDSCH determined by the UE through which the UE transmits or receives data.

Step 2: deleting, from the set Q, the survivor PDSCH determined in Step 1 and all PDSCHs that overlap (for example, overlap in time domain or in frequency domain) with the determined survivor PDSCH (note: FDM is not supported).

Step 3: repeating Step 1 and Step 2 until the set Q is empty, or until j is equal to M.

The existing solutions only support a scenario where multiple SPS PDSCHs are multiplexed in TDM manner, but do not support a scenario where multiple SPS PDSCHs are multiplexed in FDM manner.

The present application provides a method and an apparatus for determining SPS PDSCH, an electronic device and a computer-readable storage medium, which at least address the above technical issues in related art.

The concepts of the embodiments of the present application may include:

using values of the existing SPS PDSCH configuration indexes sps-ConfigIndex as the basis for determining a reception priority (or setting the multicast to have the highest priority, and then using values of the SPS PDSCH configuration indexes sps-ConfigIndex to perform the priority determination);

when determining the survivor PDSCH, adding a condition for determining whether the FDM multiplexing mode is supported and adding a determination regarding the quantity for FDM multiplexing.

It should be noted that whether the FDM multiplexing mode is supported and the quantity of PDSCHs supported in one slot depend on a capability of a terminal and a configuration of a base station. In order to facilitate the description of the implementation of technical solutions, different UE capabilities are differentiated and correspond to different embodiments.

It should be noted that, in order to enable the UE to determine the survivor SPS PDSCH in a better way, the following contents 1 and 2 may also be provided in the technical solution.

Content 1. Among the multiple activated SPS PDSCHs in a slot, compared with a unicast SPS PDSCH, a multicast SPS PDSCH having a higher priority a is determined as the survivor PDSCH.

This may be implemented by using at least one of the following two manners, namely, manner A and manner B.

Manner A: adding an offset to configuration indexes sps-ConfigIndex of all unicast SPS PDSCHs, and determining the survivor PDSCH based on a high-to-low order of the configured priorities.

For example, if the terminal is configured that the smaller the value of the configuration index is, the higher a corresponding priority is, then the terminal may adjust, according to the offset, a value of an SPS PDSCH configuration index of each SPS PDSCH in a first SPS PDSCH set for carrying unicast service, such that the adjusted value of the SPS PDSCH configuration index of each SPS PDSCH in the first SPS PDSCH set is greater than a maximum value corresponding to SPS PDSCH configuration indexes in the second SPS PDSCH set for carrying broadcast/multicast service.

The adjusting the SPS PDSCH configuration index may be represented by the following formula.

SPS PDSCH_ID'=SPS PDSCH_ID+offset

Where SPS PDSCH_ID' represents a numerical value of the adjusted SPS PDSCH configuration index; SPS PDSCH_ID represents a numerical value of the SPS PDSCH configuration index before the adjustment; "offset" represents a value of the offset, which is a positive integer. For example, the value of the offset may be a maximum quantity of SPS PDSCHs that the terminal supports to receive.

In an example, it is assumed that the activated SPS PDSCHs include 5 SPS PDSCHs in total, which are represented by u-1, u-2, m-3, m-4 and u-5, where u represents SPS PDSCH in the first SPS PDSCH set, m represents SPS PDSCH in the second SPS PDSCH set, and the Arabic value after u or m represents an original SPS PDSCH configuration index. If the maximum quantity of SPS PDSCHs that the terminal supports to receive is 2, and the terminal determines the SPS PDSCHs for transmitting and receiving data in accordance with a rule that the smaller the value of the configuration index is, the higher the corresponding priority is, then the offset may be set to 4. In this way, the SPS PDSCH configuration index of u-1 is adjusted to be u-5, which is greater than the configuration index m-4, and an SPS PDSCH (i.e., m-3) for transmission or reception is determined preferentially from SPS PDSCHs in the second SPS PDSCH set. It should be understood that when the configuration index of u-1 is adjusted, configuration indexes of u-2 and u-5 are also adjusted to be u-6 and u-9 based on the offset, respectively.

For another example, if the terminal is configured that the larger the value of the configuration index is, the higher a corresponding priority is, then the terminal may adjust, according to the offset, a value of an SPS PDSCH configuration index of each SPS PDSCH in the first SPS PDSCH set for carrying unicast service, such that the value of the SPS PDSCH configuration index of each SPS PDSCH in the first SPS PDSCH set is adjusted to be smaller than the minimum value corresponding to SPS PDSCH configuration indexes in the second SPS PDSCH set for carrying broadcast/multicast service.

The adjusting the SPS PDSCH configuration index may be represented by the following formula.

SPS PDSCH_ID'=SPS PDSCH_ID−offset

Where SPS PDSCH_ID' represents a numerical value of the adjusted SPS PDSCH configuration index; SPS PDSCH_ID represents a numerical value of the SPS PDSCH configuration index before adjustment; "offset" represents a value of the offset, which is a positive integer. For example, the value of the offset may be the maximum quantity of SPS PDSCHs that the terminal supports to receive.

In an example, it is assumed that the activated SPS PDSCHs include 5 SPS PDSCHs in total, which are represented by u-1, u-2, m-3, m-4 and u-5, where u represents SPS PDSCH in the first SPS PDSCH set, m represents SPS PDSCH in the second SPS PDSCH set, and the Arabic value after u or m represents an original SPS PDSCH configuration index. If the maximum quantity of SPS PDSCHs that the terminal supports to receive is 2, and the terminal determines the SPS PDSCHs for transmitting and receiving data in accordance with a rule that the larger the value of the configuration index is, the higher the corresponding priority is, then the offset may be set to 3. In this way, the SPS PDSCH configuration index of u-5 is adjusted to be u-2, which is smaller than the configuration index of m-3, and an SPS PDSCH (i.e., m-4) for transmission or reception is determined preferentially from the SPS PDSCHs in the second SPS PDSCH set. It should be understood that when the configuration index of u-5 is adjusted, configuration indexes of u-1 and u-2 are also adjusted to be u-(−2) and u-(−1) based on the offset, respectively.

Manner B: determining the survivor SPS PDSCH preferentially from multicast SPS PDSCHs, and then determining the survivor SPS PDSCH from unicast SPS PDSCHs.

Content 2. The base station further configures and activates virtual multicast SPS PDSCH configuration for the terminal. The virtual multicast SPS PDSCH only participates in the determination of the survivor PDSCH, but is not received by the UE, and thus is not counted in the quantity of received PDSCHs.

The technical solution of the present application and how the technical solution of the present application address the above technical issues will be described in detail below with specific embodiments. The following specific embodiments may be combined with each other, and the same or similar concepts or processes may not be repeated in some embodiments. Embodiments of the present application will be described below in conjunction with the accompanying drawings.

FIG. 1 exemplarily shows a schematic architecture diagram of a system according to an embodiment of the present application. Referring to FIG. 1, the system may include a base station and a user equipment. FIG. 1 only exemplarily shows one base station and one user equipment, but the present disclosure is not limited thereto. For example, in an embodiment of the present application, the system may include two or more UEs.

The base station provided in the embodiments of the present application may be a Node B (Node B, NB) for universal mobile telecommunications system (Universal Mobile Telecommunications System, UMTS), an evolved Node B (eNodeB, eNB) for long term evolution (Long Term Evolution, LTE), or a base station or a controller for the 5-th generation mobile communication system.

The user equipment (also referred to as terminal device) involved in the embodiments of the present application may be a device that provides voice and/or data connectivity to a user, a handheld device with a radio connection function, or other processing devices connected to a radio modem or the like. In different systems, the names of terminal may be different. For example, in the 5G system, the terminal device may be referred to as user equipment (User Equipment, UE). A radio terminal device may communicate with one or more core networks (Core Network, CNs) via a radio access network (Radio Access Network, RAN), and the radio terminal device may be a mobile terminal, such as a mobile phone (or referred to as "cellular" phone) and a computer with a mobile terminal, such as a portable, pocket-sized, hand-held, computer built-in or vehicle-mounted mobile apparatus, which exchange voice and/or data with the radio access network. For example, personal communication service (Personal Communication Service, PCS) phones, cordless phones, session initiated protocol (Session Initiated Protocol, SIP) phones, wireless local loop (Wireless Local Loop, WLL) stations, personal digital assistant (Personal Digital Assistant, PDA) and other devices. The radio terminal device may also be referred to as a system, subscriber unit (subscriber unit), subscriber station (subscriber station), mobile station (mobile station), mobile (mobile), remote station (remote station), access point (access point), remote terminal (remote terminal), access terminal (access terminal), user terminal (user terminal), user agent (user agent) and user device (user device), embodiments of the present application are not limited thereto.

Furthermore, the technical solution according to embodiments of the present application may be applied to various systems, particularly to the 5G system. For example, an applicable system may be a global system of mobile communication (global system of mobile communication, GSM) system, a code division multiple access (code division multiple access, CDMA) system, a wideband code division multiple access (Wideband Code Division Multiple Access, WCDMA) system, a general packet radio service (general packet radio service, GPRS) system, a long term evolution (long term evolution, LTE) system, an LTE frequency division duplex (frequency division duplex, FDD) system, an LTE time division duplex (time division duplex, TDD) system, a long term evolution advanced (long term evolution advanced, LTE-A) system, a universal mobile telecommunication system (universal mobile telecommunication system, UMTS), a worldwide interoperability for microwave access (worldwide interoperability for microwave access, WiMAX) system, and a 5G New Radio (New Radio, NR) system. Each of the various systems includes a terminal and a network device. The systems may further include a core network portion, such as an evolved packet system (Evolved Packet System, EPS), or a 5G system (5GS).

Figure 2:
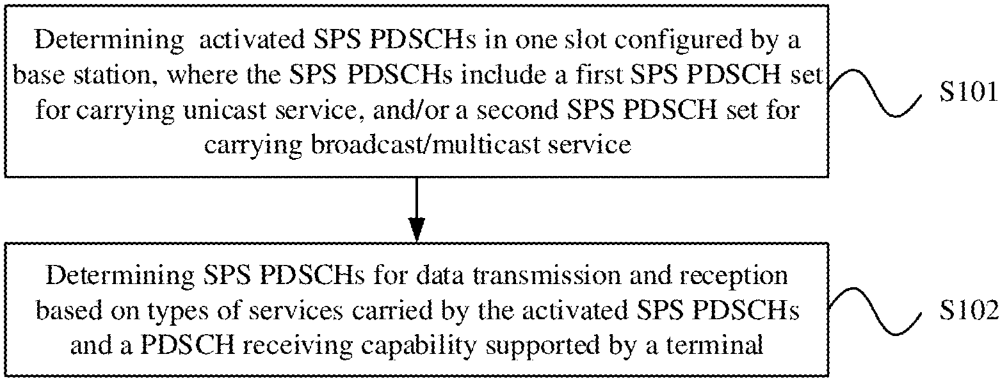
FIG. 2 is a schematic flowchart of a method for determining SPS PDSCH according to an embodiment of the present application.

FIG. 2 exemplarily shows a schematic flowchart of a method for determining SPS PDSCH according to an embodiment of the present application. In the embodiment of the present application, the method for determining the SPS PDSCH may be performed by a terminal, for example, may be performed by the user equipment in FIG. 1. As shown in FIG. 2, the method for determining the SPS PDSCH may include step S101 and step S102.

In step S101, SPS PDSCHs in a slot that are activated by a base station are determined, where the SPS PDSCHs include a first SPS PDSCH set of SPS PDSCHs for carrying unicast service and/or a second SPS PDSCH set of SPS PDSCHs for carrying broadcast/multicast service.

In an embodiment of the present application, the first SPS PDSCH set may include at least one unicast SPS PDSCH for carrying the unicast service, and the second SPS PDSCH set may include at least one multicast SPS PDSCH for carrying the broadcast/multicast service.

It should be noted that in the embodiments of the present application, one slot may refer to a time unit containing 14 symbols, or a time unit containing 12 symbols. One slot may also represent other specific time unit, for example, a time unit including an integer multiplied by 14 symbols or an integer multiplied by 12 symbols, which is not limited here.

In an embodiment of the present application, the unicast SPS PDSCH and the multicast SPS PDSCH may be distinguished according to a scrambled DCI of the activated SPS PDSCH. For example, for the unicast SPS PDSCH, the DCI is scrambled by CS-RNTI, and for the multicast SPS PDSCH, the DCI is scrambled by GCS-RNTI.

In an embodiment of the present application, the multicast may be also referred to as multicast, multicast groupcast, broadcast multicast, broadcast/multicast, and the like.

Compared with SPS PDSCHs activated by the base station carry the same type of service (for example, unicast or multicast) in the related art, in the embodiments of present application, the activated SPS PDSCHs include both unicast SPS PDSCH(s) and multicast SPS PDSCH(s), where the unicast SPS PDSCH(s) are grouped into the first SPS PDSCH set, and the multicast SPS PDSCH(s) are grouped into the second SPS PDSCH set, based on which the UE is enabled to obtain multiple types of SPS PDSCHs. It should be understood that the activated SPS PDSCHs are SPS PDSCHs transmitted by the base station to the UE, and the UE needs to further filter out, from the activated SPS PDSCHs, SPS PDSCHs for data transmission and reception, that is, the survivor SPS PDSCHs.

In step S102, SPS PDSCHs for transmitting or receiving data are determined based on types of services carried by the activated SPS PDSCHs and a PDSCH reception capability supported by a terminal In an embodiment of the present application, the PDSCH reception capability supported by the terminal includes a capability of a supported frequency division multiplexing (FDM) multiplexing mode determined by the terminal, and the quantity of PDSCHs that the terminal supports to receive in a slot.

In an embodiment of the present application, the capability of the supported FDM multiplexing mode determined by the terminal refers to the quantity of unicast SPS PDSCHs and the quantity of multicast SPS PDSCHs in one set of SPS PDSCHs that are allowed to be multiplexed by the terminal, in a case that the one set of SPS PDSCHs having an FDM relationship exists. Based on this capability, if SPS PDSCHs for transmitting and receiving data finally determined by the terminal have an overlapping in time domain, the capability of the supported FDM multiplexing mode determined by the terminal should be satisfied. For example, if the capability of the supported FDM multiplexing mode determined by the terminal is that a multiplexing of one unicast SPS PDSCH and two multicast SPS PDSCHs is allowed, and in the finally determined SPS PDSCHs for transmitting and receiving data, there is one unicast SPS PDSCH and the unicast SPS PDSCH has an FDM relationship with other SPS PDSCH (s), then the other SPS PDSCH(s) shall be multicast SPS PDSCH(s), and the quantity of the other SPS PDSCH(s) shall not be greater than 2.

In the method for determining the SPS PDSCH according to embodiments of the present application, by determining the SPS PDSCHs activated by the base station in one slot, where the SPS PDSCHs includes the first SPS PDSCH set for carrying unicast service and/or the second SPS PDSCH set for carrying broadcast/multicast service, it is enabled that multiple types of SPS PDSCHs are determined to be used for transmitting or receiving data. By determining the SPS PDSCHs for transmitting and receiving data based on the types of services carried by the activated SPS PDSCHs, and the capability of receiving PDSCH supported by the terminal (for example, the capability of the frequency division multiplexing (FDM) multiplexing mode that is supported and determined by the terminal), a manner for determining survivor PDSCHs in a case that the FDM multiplexing mode for PDSCH is supported is provided. This can ensure the terminal to receive SPS PDSCHs correctly and effectively, thereby saving air interface resources and improving user experience.

On the basis of the embodiments, in an optional embodiment, the capability of the supported FDM multiplexing mode determined by the terminal may be: a capability to enable determining types of services carried by SPS PDSCHs for transmitting or receiving data from SPS PDSCHs having the FDM relationship, and the quantity of SPS PDSCHs corresponding to each of the types.

Table 1 exemplarily shows an FDM multiplexing capability table according to an embodiment of the present application. As shown in Table 1, in an embodiment of the present application, the capability of the supported FDM multiplexing mode determined by the terminal may include two types, that is, it may have two kinds of capabilities for FDM multiplexing, which are respectively represented as capability A and capability B in the table.

The capability A refers to: in a slot, what is supported is only an FDM multiplexing mode in which the unicast PDSCH is multiplexed with the multicast PDSCH. The capability B refers to: in a slot, what is supported is an FDM multiplexing mode in which the unicast PDSCH is multiplexed with the multicast PDSCH, or an FDM multiplexing mode in which the multicast PDSCH and is multiplexed with multicast PDSCH. The UE may report (for example, report to the base station) that the capability A or the capability B is supported, or may report that neither the capability A nor the capability B is supported, which is not limited herein.

TABLE 1

FDM multiplexing capability table

| FDM capability | FDM multiplexing mode | The quantity of FDM multiplexes | Total quantity of PDSCHs in a slot (M) |
|---|---|---|---|
| Capability A | unicast PDSCH + multicast PDSCH | 1 unicast PDSCH + (N − 1) multicast PDSCHs | M = {2, 4, 5, 7, 8, 10} |
| Capability B | unicast PDSCH + multicast PDSCH or, multicast PDSCH + multicast PDSCH | 0 unicast PDSCH + N multicast PDSCHs or, 1 unicast PDSCH + (N − 1) multicast PDSCHs | M = {2, 4, 5, 7, 8, 10} |

It should be noted that in Table 1, N represents the maximum quantity of multiplexed SPS PDSCHs in a slot supported by the terminal in a set of SPS PDSCHs have overlapping in time domain and/or in frequency domain; for M={2,4,5,7,8,10}, numbers 2, 4, 5, 7, 8 and 10 represent configuration indexes corresponding to activated SPS PDSCHs. The capability A, the capability B, and values of parameters N and M may be reported to the base station by the terminal, or may be determined based on a negotiation between the base station and the terminal. In the following description of embodiments, a case where N=2 and M=M are taken as an example for illustration.

On the basis of the embodiments, in an optional embodiment, the capability (capability A) of the FDM multiplexing mode specifically includes: for SPS PDSCHs having an FDM relationship, a capability to supports determining one SPS PDSCH for carrying unicast service and at most (n−1) SPS PDSCHs for carrying broadcast/multicast service, as SPS PDSCHs for transmitting or receiving data, where n is the maximum quantity of multiplexed SPS PDSCHs, among one set of SPS PDSCHs having the FDM relationship, in a slot used by the terminal to transmit and/or receive data.

In other words, in the embodiment of the present application, the FDM multiplexing capability may refer to: FDM multiplexing between one unicast SPS PDSCH and one or more multicast SPS PDSCHs that have the FDM relationship are supported. Namely, in the embodiment of the present application, the followings are not supported: SPS PDSCHs that have resource element (Resource Element, RE) overlapping cannot be used as the survivor SPS PDSCHs at the same time; and one unicast SPS PDSCH and more than (n−1) multicast SPS PDSCHs are used as the survivor SPS PDSCHs at the same time.

Figure 3:
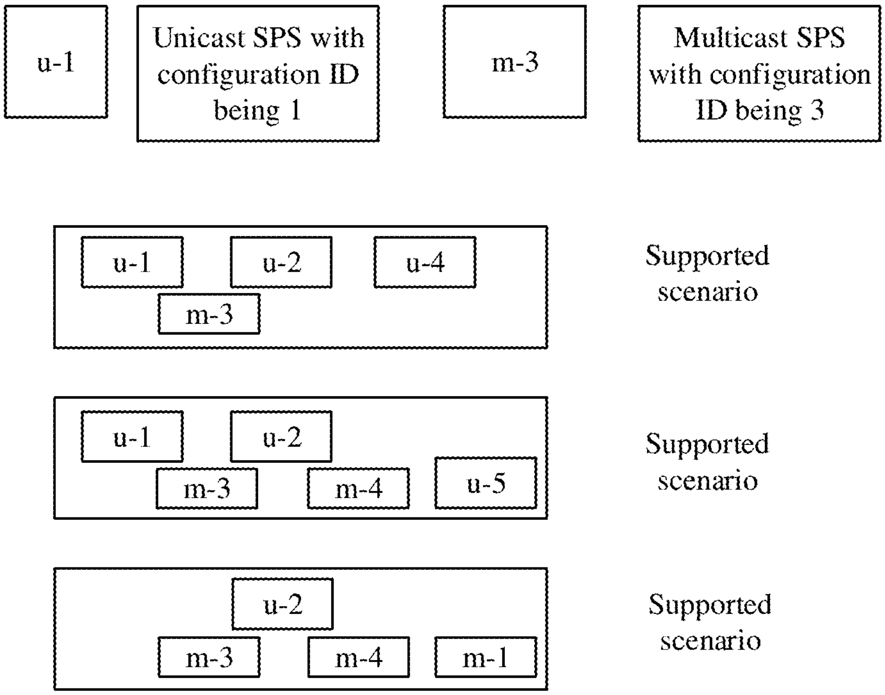
FIG. 3 is a schematic diagram of scenarios supporting FDM multiplexing capability A according to an embodiment of the present application.

FIG. 3 is a schematic diagram of a scenario where FDM multiplexing capability A is supported according to an embodiment of the present application. As shown in FIG. 3, the embodiment of the present application is applicable to a scenario where multiple unicast SPS PDSCHs and one multicast SPS PDSCH are activated, a scenario where multiple unicast SPS PDSCHs and multiple multicast SPS PDSCHs are activated, and a scenario where one unicast SPS PDSCH and multiple multicast SPS PDSCH are activated. In FIG. 3, u-1 represents an SPS PDSCH configuration for unicast (unicast), and a value of its configuration index (also referred to as configuration ID) sps-ConfigIndex is 1; m-3 represents an SPS PDSCH configuration for multicast (multicast), and a value of its configuration ID (sps-ConfigIndex) is 3.

On the basis of the embodiments, in an optional embodiment, the determining the SPS PDSCHs for transmitting or receiving data based on the types of the services carried by the activated SPS PDSCHs and the PDSCH reception capability supported by the terminal may include step S201 and step S202.

In step S201, priorities of the activated SPS PDSCHs are determined.

In the conventional solution, priorities of SPS PDSCHs (PDSCHs without PDCCH scheduling) are determined according to SPS PDSCH configuration indexes (sps-ConfigIndex). In an embodiment of the present application, in order to make full use of the conventional procedure and decrease the modification of protocols, the priorities may still be determined by the numerical value of the SPS PDSCH configuration index, and other methods for determining the priorities may also be applicable. For example, a priority of the multicast SPS PDSCH is higher than that of the unicast SPS PDSCH, or a priority of an SPS PDSCH supporting the FDM multiplexing mode is higher than that of a PDSCH supporting the TDM multiplexing mode.

It should be understood that when the priority is determined by the value of the SPS PDSCH configuration index, it may be configured that a relatively smaller value of the configuration index denotes a relatively higher priority; or a relatively larger value of the configuration index denotes a relatively higher priority.

In the embodiment of the present application, the priority of the multicast PDSCH being higher than the priority of the unicast PDSCH may refer to: firstly determining SPS PDSCH(s) for transmitting or receiving data from the multicast SPS PDSCH set (i.e., the second SPS PDSCH set), if the quantity of SPS PDSCHs for transmitting or receiving data determined from the second SPS PDSCH set does not satisfy the PDSCH reception capability supported by the terminal, then determining SPS PDSCH(s) for transmitting or receiving data from the first SPS PDSCH set, until the PDSCH reception capability supported by the terminal is satisfied.

In step S202, the SPS PDSCHs for transmitting or receiving data are determined based on a high-to-low order of the priorities of the activated SPS PDSCHs, the types of the services carried by the activated SPS PDSCHs and the PDSCH reception capability supported by the terminal.

It may be understood that, in an embodiment of the present application, the activated SPS PDSCHs may be traversed based on the order of priorities from high to low; when a currently traversed SPS PDSCH is determined as an SPS PDSCH for transmitting or receiving data, SPS PDSCH (s) that does not satisfy the PDSCH reception capability supported by the terminal are deleted from the activated SPS PDSCHs, according to a type of a service carried by the currently traversed SPS PDSCH (that is, according to the fact that the SPS PDSCH is a unicast SPS PDSCH or a multicast SPS PDSCH), so as to prevent a subsequently traversed SPS PDSCH from affecting the SPS PDSCH for transmitting or receiving data that has been already determined previously.

On the basis of the embodiments, in an optional embodiment, the determining the SPS PDSCHs for transmitting or receiving data based on the high-to-low order of the priorities of the activated SPS PDSCHs, the types of the services carried by the activated SPS PDSCHs and the PDSCH reception capability supported by the terminal may include: based on the high-to-low order of the priorities of the activated SPS PDSCHs, the types of the services carried by the activated SPS PDSCHs and the capability of the supported FDM multiplexing mode determined by the terminal, determining the SPS PDSCHs for transmitting or receiving data from the activated SPS PDSCHs until the quantity of the determined SPS PDSCHs for transmitting or receiving data satisfy a maximum quantity of SPS PDSCHs that the terminal supports to receive.

Specifically, in an embodiment of the present application, it is assumed that: a set of activated SPS PDSCHs in a slot may be represented as a set Q; in the set Q, values of SPS PDSCH configuration indexes of multicast SPS PDSCHs and unicast SPS PDSCHs may be different from each other; priorities are determined according to numerical values of the SPS PDSCH configuration indexes (sps-ConfigIndex), and a smaller numerical value represents a higher priority.

The method for determining the PDSCHs for transmitting or receiving data by the UE may include: starting a traversing on SPS PDSCHs in the set Q based on an order of values of the SPS PDSCH configuration indexes (sps-ConfigIndex) from small to large. Before starting the traversing, a traverse parameter j may be set to be 0 (that is, the quantity of PDSCHs that have been selected and have been demodulated by the UE, and the traverse parameter may also be referred to as the quantity of iterations). When a currently traversed SPS PDSCH is selected by the UE and determined as an SPS PDSCH for transmitting or receiving data (that is, the survivor PDSCH), the traverse parameter is set as j=j+1, and SPS PDSCH(s) that does not satisfy the capability of the FDM multiplexing mode supported by the terminal is deleted from the set Q, so as to prevent a subsequently traversed SPS PDSCH from affecting the SPS PDSCH that have been determined previously for transmitting or receiving data.

For example, the method may be implemented through the following Step 10 to Step 13.

Step 10: setting j=0, where j is the quantity of PDSCHs have been selected and have been demodulated by a UE.

Step 11: selecting, by the UE from the set Q, a PDSCH whose configuration index sps-ConfigIndex has the smallest value, setting j=j+1, and recording the selected PDSCH as a survivor PDSCH.

Step 12: in a case that the UE supports the multiplexing capability A (that is, FDM multiplexing of unicast and multicast), performing the following Step 12_1 to Step 12_3.

Step 12_1: recording a type of the survivor PDSCH determined in Step 11 (for example, unicast type or multicast type).

Step 12_2: deleting, from the set Q, all PDSCH(s) that have the same type as that of the survivor PDSCH determined in Step 11 and overlap with the survivor PDSCH in the time domain (FDM between PDSCHs of the same type is not supported).

Step 12_3: deleting, from the set Q, the survivor PDSCH determined in Step 11 and all PDSCHs that overlap with the determined survivor PDSCH in RE resources (time domain resources and frequency domain resources between PDSCHs cannot conflict with each other, regardless the PDSCHs belong to the same type or different types).

Step 13: executing Step 11 and Step 12 repeatedly until the set Q is empty, or until j is equal to M (M is the maximum quantity of PDSCHs that the UE supports to receive in a slot).

The survivor PDSCHs may be the PDSCHs that the terminal needs to receive, that is, the SPS PDSCHs determined by the terminal for transmitting and receiving data.

The followings should be noted:

1. In the embodiments of the present application, an SPS PDSCH may be an activated SPS PDSCH that does not conflict with a semi-persistent TDD configuration.

2. For the set Q of SPS PDSCHs, SPS PDSCH overlapping with uplink symbols in the time domain need to be deleted first, as the SPS PDSCHs need to be transmitted on downlink symbols.
3. Every time a survivor PDSCH is selected in Step 11, such survivor PDSCH needs to be removed from the set Q.

Figure 4:
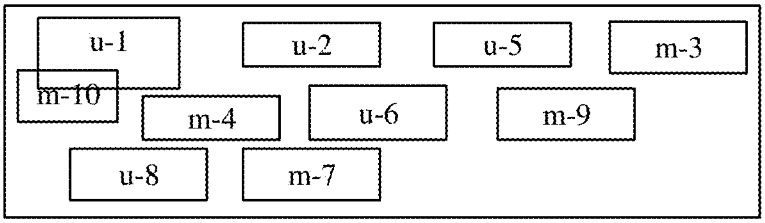
FIG. 4 is a schematic diagram of a relationship between activated SPS PDSCHs in a slot in time domain and frequency domain according to an embodiment of the present application.

Description will be given below with a specific example. FIG. 4 exemplarily shows a schematic diagram of a relationship among activated SPS PDSCHs in a slot in time domain and frequency domain according to another embodiment of the present application. It should be noted that in FIG. 4, the horizontal direction represents the time domain, and the vertical direction represents the frequency domain. If two SPS PDSCHs overlap in the vertical direction, it means that the two SPS PDSCHs have resource element (Resource Element, RE) overlapping. If two SPS PDSCHs overlap in the horizontal direction but does not overlap in the vertical direction, it means that there is an FDM relationship between the two SPS PDSCHs.

A total of 10 SPS PDSCHs are activated in one slot as shown in FIG. 4, where a first SPS PDSCH set includes SPS PDSCHs represented by u-1, u-2, u-5, u-6 and u-8, and a second SPS PDSCH set includes m-3, m-4, m-7, m-9 and m-10. Arabic numerals after u and m represent configuration indexes corresponding to respective SPS PDSCHs, where SPS PDSCHs u-1, m-4 and u-8 are in FDM relationship (that is, u-1, m-4 and u-8 are a set of SPS PDSCHs having the FDM relationship), SPS PDSCHs u-1 and m-10 overlap in RE, SPS PDSCHs u-2, m-4, u-6, and m-7 are in the FDM relationship (that is, u-2, m-4, u-6, and m-7 are a set of SPS PDSCHs having the FDM relationship), and SPS PDSCHs u-5 and m-9 have the FDM relationship (that is, u-5 and m-9 are a set of SPS PDSCHs having the FDM relationship), and the like.

It is assumed that a reception capability reported by the UE is N=2 and M=5. That is to say, it is assumed that, in one set of SPS PDSCHs having the FDM relationship, the maximum quantity of SPS PDSCHs that the terminal can use for transmitting and/or receiving data is 2, and the maximum quantity of PDSCHs that the terminal supports to receive in one slot is 5. For example, in one set of SPS PDSCHs having an FDM relationship, such as in the set including SPS PDSCHs u-2, m-4, u-6, and m-7, the following is supported: determining one SPS PDSCH for carrying the unicast service (for example, u-2) and at most (n−1)=1 SPS PDSCH (for example, m-4) for carrying the broadcast/multicast service, as SPS PDSCHs for transmitting or receiving data.

In the first traversing loop (loop-1), the PDSCH with the smallest configuration index sps-ConfigIndex (i.e., u-1) is selected as a first survivor PDSCH, the PDSCH, u-8, which has the same data type as that of the first survivor PDSCH and overlaps with the first survivor PDSCH in the time domain, is deleted. The PDSCH, m-10, which has overlap in RE (overlap in the frequency domain) with the first survivor PDSCH, is deleted.

In the second traversing loop (loop-2), the PDSCH with the smallest configuration index sps-ConfigIndex (i.e., u-2) is selected as a second survivor PDSCH, and the PDSCH, u-6, which has the same data type as that of the second survivor PDSCH and overlaps with the second survivor PDSCH in the time domain, is deleted.

In the third traversing loop (loop-3), the PDSCH with the smallest configuration index sps-ConfigIndex (i.e., m-3) is selected as a third survivor PDSCH, and the PDSCH, m-9, which has the same data type as that of the third survivor PDSCH and are in FDM relationship with the third survivor PDSCH, is deleted.

In the fourth traversing loop (loop-4), the PDSCH with the smallest configuration index sps-ConfigIndex (i.e., m-4) is selected as a fourth survivor PDSCH, and the PDSCH, m-7, which has the same data type as that of the fourth survivor PDSCH and are in FDM relationship with the fourth survivor PDSCH, is deleted.

In the fifth traversing loop (loop-5), the PDSCH with the smallest configuration index sps-ConfigIndex (i.e., u-5) is selected as a fifth survivor PDSCH.

On the basis of the embodiments, in an embodiment of the present application, M survivor PDSCHs may be determined, respectively, according to unicast and multicast dimensions. Based on a small-to-large order of values of configuration indexes sps-ConfigIndex of the survivor unicast PDSCHs and the survivor multicast PDSCHs, M PDSCHs sequentially determined as the survivor PDSCHs for receiving. Specifically, the determining the SPS PDSCHs for transmitting or receiving data based on the types of the services carried by the activated SPS PDSCHs and the PDSCH reception capability supported by the terminal may include steps S301 to S304.

In step S301, a priority of each of the SPS PDSCHs in the first SPS PDSCH set and a priority of each of the SPS PDSCHs in the second SPS PDSCH set are determined.

It may be known from the above embodiments that in the embodiment of the present application, values of the configuration indexes of multiple SPS PDSCHs may be used as a basis for determining the priority.

In step S302, first candidate SPS PDSCH(s) for transmitting or receiving data is determined from the first SPS PDSCH set, according to the priority of each SPS PDSCH in the first SPS PDSCH set and the PDSCH reception capability supported by the terminal.

In step S303, second candidate SPS PDSCH(s) for transmitting or receiving data is determined from the second SPS PDSCH set, according to the priority of each SPS PDSCH in the second SPS PDSCH set and the PDSCH reception capability supported by the terminal.

In step S304, the SPS PDSCHs for transmitting or receiving data are determined from the first candidate SPS PDSCH(s) for transmitting or receiving data and the second candidate SPS PDSCH(s) for transmitting or receiving data.

On the basis of the embodiments, in an optional embodiment, the determining the SPS PDSCHs for transmitting or receiving data from the first candidate SPS PDSCH(s) for transmitting or receiving data and the second candidate SPS PDSCH(s) for transmitting or receiving data may include: determining priorities of all SPS PDSCHs in the first candidate SPS PDSCH(s) and the second candidate SPS PDSCH(s); and based on a high-to-low order of the priorities of all the SPS PDSCHs in the first candidate SPS PDSCH(s) and the second candidate SPS PDSCH(s), determining a quantity of SPS PDSCHs for transmitting or receiving data, where the quantity of SPS PDSCHs for transmitting or receiving data does not exceed a maximum quantity.

In the embodiment of the present application, the value of the configuration index of each of SPS PDSCHs in the first candidate SPS PDSCH(s) and the second candidate SPS PDSCH(s) may be used as the basis for determining the priority. In this way, whether there is any SPS PDSCH among the two candidate SPS PDSCHs that does not meet the PDSCH reception capability supported by the terminal is further determined according to a high-to-low order of priorities of all the SPS PDSCHs in the first candidate SPS PDSCH(s) and the second candidate SPS PDSCH(s), so as to obtain the final SPS PDSCHs for the UE to transmit and/or receive data.

The above-mentioned steps S301 to S303 may be specifically implemented through the following loop of STEP A including Step 20 to Step 23.

Step 20 to Step 23 in the loop of STEP A are similar to the above-mentioned Step 10 to Step 13, and parameters as involved are also similar to those involved in Step 10 to Step 13, which are not repeated here.

Step 20: setting j=0, where j is the quantity of PDSCHs have been selected and have been demodulated by the UE. Set R is a set of SPS PDSCHs of the same type activated in a slot (e.g., the set R may represent the first SPS PDSCH set or the second SPS PDSCH set).

Step 21: selecting, by the UE from the set R, a PDSCH whose configuration index sps-ConfigIndex has the smallest value, setting j=j+1, and recording the selected PDSCH as a survivor PDSCH.

Step 22: deleting, from the set R, the survivor PDSCH determined in Step 21 and all PDSCH(s) that overlap with the determined survivor PDSCH in the time domain or the frequency domain (FDM is not supported).

Step 23: executing Step 21 and Step 22 repeatedly until the set R is empty, or until j is equal to M (M is the maximum quantity of PDSCHs that the UE supports to receive in a slot).

In a case where the UE supports the multiplexing capability A (FDM multiplexing of unicast and multicast), the step S304 may be implemented through the following loop of STEP B including Step 30 to Step 33.

Step 30: setting j=0, where j is the quantity of PDSCHs have been selected and have been demodulated by the UE. Set P is a set of survivor PDSCHs determined in the loop of STEP A (including survivor PDSCHs of unicast and multicast).

Step 31: selecting, by the UE from the set P, a PDSCH whose configuration index sps-ConfigIndex has the smallest value, setting j=j+1, and recording the selected PDSCH as a survivor PDSCH.

Step 32: deleting, from the set P, the survivor PDSCH determined in Step 31 and all PDSCH(s) overlapping with the determined survivor PDSCH in RE (time domain resources or frequency domain resources for PDSCHs of unicast and multicast cannot conflict with each other).

Step 33: executing Step 31 and Step 32 repeatedly until the set P is empty, or until j is equal to M (M is the maximum quantity of PDSCHs that the UE supports to receive in a slot).

The followings should be noted:

1. For the set Q of SPS PDSCHs, SPS PDSCHs overlapping with uplink symbols in the time domain need to be deleted first, as the SPS PDSCHs need to be transmitted on downlink symbols.
2. The survivor PDSCH selected in Step 21 and Step 31 needs to be removed from the corresponding set R and set P.

In the following, a detailed description will be given by taking the embodiment shown in FIG. 4 as an example.

For the loop of STEP A on the first SPS PDSCH set: the survivor PDSCHs include u-1, u-2, and u-5.

For the loop of STEP A on the second SPS PDSCH set: the survivor PDSCHs include m-3, m-4, and m-10.

For the loop of STEP B, the finally determined survivor PDSCHs include u-1, u-2, m-3, m-4, and u-5 (m-10 is excluded because it overlaps with u-1 in RE).

On the basis of the embodiments, in an optional embodiment, the determined SPS PDSCHs for transmitting or receiving data are not overlapped with each other in frequency domain.

In a case that there is at least one set of SPS PDSCHs overlapping in the time domain in SPS PDSCHs determined to be used for data transmission and reception, one SPS PDSCH for carrying unicast service and at most (n−1) SPS PDSCHs for carrying broadcast/multicast service included in the set of SPS PDSCHs overlapping in the time domain are determined as SPS PDSCHs for transmitting or receiving data.

On the basis of the embodiments, in an optional embodiment, the capability of the supported FDM multiplexing mode (capability B) may specifically include: a capability to: support determining, in SPS PDSCHs having an FDM relationship, one SPS PDSCH for carrying unicast service and at most (n−1) SPS PDSCHs for carrying broadcast/multicast service as SPS PDSCHs for transmitting or receiving data, or support determining, in SPS PDSCHs having an FDM relationship, at most n SPS PDSCHs for carrying broadcast/multicast service as SPS PDSCHs for transmitting or receiving data, where n is a maximum multiplexing quantity in a slot supported by the terminal among one set of SPS PDSCHs overlapping in time domain and/or in frequency domain.

Figure 5:
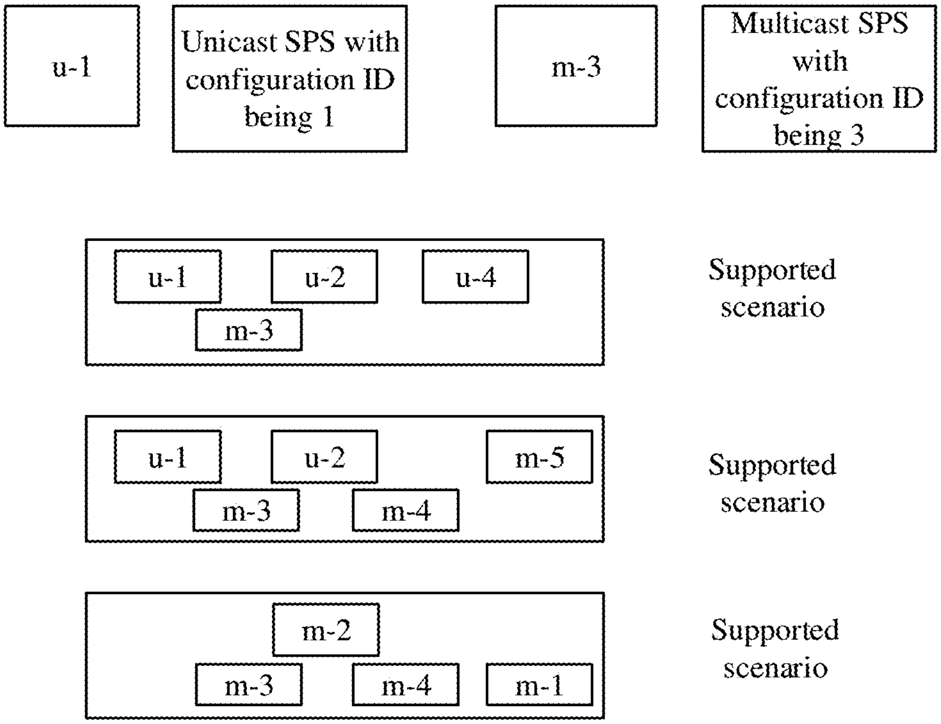
FIG. 5 is a schematic diagram of scenarios supporting FDM multiplexing capability B according to an embodiment of the present application.

FIG. 5 is a schematic diagram of a scenario where FDM multiplexing capability B is supported according to an embodiment of the present application. As shown in FIG. 5, the embodiment of the present application is applicable to a scenario where multiple unicast SPS PDSCHs and one multicast SPS PDSCH are activated, a scenario where multiple unicast SPS PDSCHs and multiple multicast SPS PDSCHs are activated, and a scenario where only multiple multicast SPS PDSCH are activated. In FIG. 5, u-1 represents an SPS PDSCH configuration for unicast (unicast), and a value of its configuration ID (sps-ConfigIndex) is 1; m-3 represents an SPS PDSCH configuration for multicast (multicast), and a value of its configuration ID (sps-ConfigIndex) is 3.

On the basis of the embodiments, in an optional embodiment, the determining SPS PDSCHs for transmitting or receiving data based on the types of the services carried by the activated SPS PDSCHs and the PDSCH reception capability supported by the terminal may include: determining priorities of the activated SPS PDSCHs; and determining, based on a high-to-low order of the priorities of the activated SPS PDSCHs, the types of the services carried by the activated SPS PDSCHs and the PDSCH reception capability supported by the terminal, the SPS PDSCHs for transmitting or receiving data.

In a scenario of the multiplexing capability B, the solution for determining survivor PDSCHs mainly involves:

1. Determination as to priorities is based on values of configuration IDs (sps-ConfigIndex) (for example, a smaller value corresponds to a higher priority, or vice versa).
2. Determination as to FDM multiplexing of PDSCHs for different types of services: in a case that two PDSCHs have different types of services (such as, one is unicast and the other is multicast), the two PDSCHs are overlapped in the time domain, and not overlapped in any resource element (resource element, RE), the two PDSCHs are suitable for FDM multiplexing of PDSCHs for different types of services.

3. Determining as to FDM multiplexing of PDSCHs for multicast service: in a case that the service types of the two PDSCHs are both multicast, the two PDSCHs are overlapped in the time domain, and not overlapped in any RE, the two PDSCHs are suitable for FDM multiplexing of PDSCHs for multicast service.
4. Limitation on the quantity of FDM-ed PDSCHs: not exceeding a corresponding UE capability.

On the basis of the embodiments, in an optional embodiment, the determining the SPS PDSCHs for transmitting or receiving data based on the high-to-low order of the priorities of the activated SPS PDSCHs, the types of the services carried by the activated SPS PDSCHs and the PDSCH reception capability supported by the terminal may include: in a case that a currently traversed SPS PDSCH determined based on the order is a unicast SPS PDSCH, SPS PDSCH(s) that overlaps with the currently traversed SPS PDSCH in time domain is deleted from a set of the activated SPS PDSCHs; and in a case that the currently traversed SPS PDSCH determined based on the order is a multicast SPS PDSCH, and a sum of the quantity of the currently traversed SPS PDSCH and the quantity of SPS PDSCHs, which have been determined to be used for transmitting or receiving data and have the FDM relationship with the currently traversed SPS PDSCH, exceeds the first maximum quantity, the currently traversed SPS PDSCH is not determined as an SPS PDSCH for transmitting or receiving data, and the currently traversed SPS PDSCH is deleted from the set of the activated SPS PDSCHs.

In one slot, at most two (N=2) PDSCHs are multiplexed in the FDM mode, and the total quantity of received PDSCHs is M (M>2).

It is assumed that, values of configuration indexes sps-ConfigIndex of multicast SPS PDSCHs and unicast SPS PDSCHs are different from each other, a priority is determined according to the value of the SPS PDSCH configuration ID (sps-ConfigIndex), and the smaller the value is, the higher the priority is. The method for determining PDSCHs to be received by the UE may include following Step 40 to Step 43.

Step 40: setting j=0, where j is the quantity of PDSCHs have been selected and demodulated by the UE. Set Q is a set of SPS PDSCHs that are activated in one slot and do not conflict with a semi-static TDD configuration.

Step 41: selecting, by the UE from the set Q, a PDSCH whose configuration index sps-ConfigIndex has the smallest value, setting j=j+1, and recording the selected PDSCH as a survivor PDSCH.

Step 42: in a case that the UE supports the multiplexing capability B (FDM multiplexing of unicast/multicast and multicast), performing the following Step 42_1 to Step 42_4.

Step 42_1: recording a type of the survivor PDSCH determined in Step 41 (for example, unicast type or multicast type).

Step 42_2: if the type recorded in Step 42_1 is unicast, deleting, from the set Q, all PDSCH(s) that have the same type as that of the survivor PDSCH determined in Step 41 and have an FDM relationship with the survivor PDSCH (FDM for PDSCHs of the unicast type is not supported).

Step 42_3: deleting, from the set Q, the survivor PDSCH determined in Step 41 and all PDSCH(s) that overlap with the determined survivor PDSCH in RE resource (note: time domain resources and frequency domain resources between two PDSCHs cannot conflict with each other, but FDM for multicast PDSCHs is supported).

Step 42_4: if in the survivor PDSCHs determined in Step 41 and the previously recorded survivor PDSCH(s), more than N PDSCHs are overlapped in at least one time-domain symbol, deleting, from the set Q, a PDSCH whose priority is the lowest among the more than N PDSCHs having overlapping in the time domain, until the possible FDM multiplexing quantity reaches the FDM capability N (N=2) of the UE (note: if N is equal to 2, FDM for more than 2 PDSCHs is not supported).

Step 43: executing Step 41 and Step 42 repeatedly until the set Q is empty, or until j is equal to M (M is the maximum quantity of PDSCHs that the UE supports to receive in one slot).

The survivor PDSCHs may be used as the PDSCHs that the terminal needs to receive.

It should be noted that in Step 42_4, since the capability for the quantity of FDM-ed PDSCH is 2, when the quantity of the FDM-ed PDSCHs is greater than 2, some PDSCH needs to be deleted, and a configuration ID with a larger value has the lower priority. Except for the steps described in the embodiment (disadvantage of which is that a PDSCH may be deleted by mistake), the way to perform the deletion may also be described as following manner.

Manner 1: in Step 42_4, if among the survivor PDSCH determined in Step 41 and the previously recorded survivor PDSCH(s), more than two PDSCHs are overlapped in at least one time-domain symbol, deleting the survivor PDSCH determined in Step 41, setting j=j-1 (to restore a count for the survivor PDSCH), and restoring the PDSCHs that have been deleted in Step 42_2 and Step 42_3.

Manner 2: Step 42-4 is deleted, and instead following Step 42_1a is added between Step 42_1 and Step 42_2.

Step 42_1a: if among the survivor PDSCH determined in Step 41 and the previously recorded survivor PDSCH (s), more than two PDSCHs are overlapped in at least one time-domain symbol, the survivor PDSCH determined in Step 41 is deleted, and then go to perform Step 41.

Figure 6:
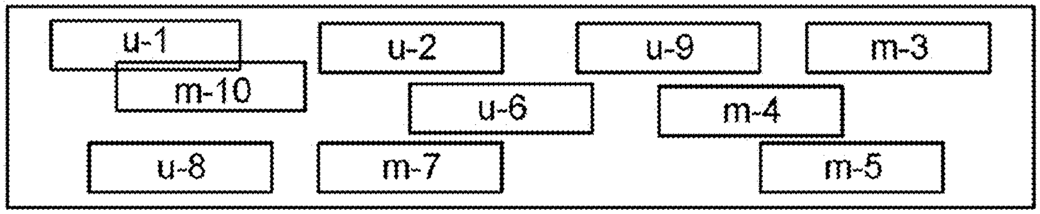
FIG. 6 is a schematic diagram of a relationship between activated SPS PDSCHs in a slot in time domain and frequency domain according to another embodiment of the present application.

Explanation is provided below with a specific example. FIG. 6 exemplarily shows a schematic diagram of a relationship among activated SPS PDSCHs in a slot in time domain and frequency domain according to another embodiment of the present application. It should be noted that in FIG. 6, the horizontal direction represents the time domain, and the vertical direction represents the frequency domain. If two SPS PDSCHs are overlapped in the vertical direction, it means that the two SPS PDSCHs are overlapped in resource element (Resource Element, RE). If two SPS PDSCHs are overlapped in the horizontal direction, but not overlapped in the vertical direction, it means that there may be an FDM relationship between the two SPS PDSCHs.

A total of 10 SPS PDSCHs are activated in a slot shown in FIG. 6, where the first SPS PDSCH set includes SPS PDSCHs represented by u-1, u-2, u-6, u-8, and u-9, and the second SPS PDSCH set includes m-3, m-4, m-5, m-7 and m-10. The Arabic numeral after u and m represent the configuration index (sps-ConfigIndex) corresponding to the SPS PDSCH, where SPS PDSCHs u-1, m-10 and u-8 have the FDM relationship, SPS PDSCHs u-2, u-6 and m-7 have the FDM relationship, SPS PDSCHs u-9 and m-4 have the FDM relationship, and so on.

It is assumed that the reception capability reported by the UE is N=2, and M=5.

In the first traversing loop (loop-1): the PDSCH with the smallest configuration index sps-ConfigIndex (i.e., u-1) is selected as a first survivor PDSCH, the type of the first survivor PDSCH is recorded as unicast, the PDSCH, u-8, which is the same data type as that of the first survivor PDSCH and is in the FDM relationship with the survivor PDSCH, is deleted. In addition, the PDSCH, m-10, which overlaps with the first survivor PDSCH in RE, is deleted.

In the second traversing loop (loop-2): the PDSCH with the smallest configuration index sps-ConfigIndex (i.e., u-2) is selected as a second survivor PDSCH, the type of the second survivor PDSCH is recorded as unicast, and the PDSCH, u-6, which has the same data type as that of the second survivor PDSCH and is in the FDM relationship with the second survivor PDSCH, is deleted.

In the third traversing loop (loop-3): the PDSCH with the smallest configuration index sps-ConfigIndex (i.e., m-3) is selected as a third survivor PDSCH, the type of the third survivor PDSCH is recorded as multicast. A PDSCH (i.e., m-5), together with which more than two FDM-ed PDSCHs including the third survivor PDSCH can be formed, is deleted (note: three PDSCHs m-3, m-4, and m-5 overlap in at least one frequency-domain symbol, and PDSCH m-5, whose priority is the lowest, is deleted).

In the fourth traversing loop (loop-4): the PDSCH with the smallest configuration index sps-ConfigIndex (i.e., m-4) is selected as a fourth survivor PDSCH, and a type of the fourth survivor PDSCH is recorded as multicast.

In the fifth traversing loop (loop-5): the PDSCH with the smallest configuration index sps-ConfigIndex (i.e., m-7) is selected as a fifth survivor PDSCH, and a type of the fifth survivor PDSCH is recorded as multicast.

On the basis of the embodiments, in an optional embodiment, the PDSCH reception capability supported by the terminal provided by embodiments of the present application further includes: a capability of a supported time division multiplexing (TDM) multiplexing mode determined by the UE, and a second maximum quantity of SPS PDSCHs that the terminal supports to receive in the TDM multiplexing mode.

It should be noted that all the above embodiments relate to the capability of the supported FDM multiplexing mode. Correspondingly, the maximum quantity of SPS PDSCHs that the terminal supports to receive under the FDM multiplexing mode is also referred to as the first maximum quantity.

When the terminal supports both the capability of the FDM multiplexing mode and the capability of the TDM multiplexing mode, in the present application, among two set of SPS PDSCHs for transmitting or receiving data determined based on the two capabilities, a set of SPS PDSCHs whose quantity of SPS PDSCHs is larger is determined as the final SPS PDSCHs for transmitting and receiving data.

Specifically, the determining the SPS PDSCHs for transmitting or receiving data may further include: in a case that the first maximum quantity is different from the second maximum quantity, obtaining SPS PDSCHs for transmitting or receiving data determined by the terminal for the TDM multiplexing mode; and based on a second quantity of SPS PDSCHs for transmitting or receiving data determined by the terminal for the TDM multiplexing mode and a first quantity of SPS PDSCHs for transmitting or receiving data determined by the terminal for the FDM multiplexing mode, determining, one of the first quantity of SPS PDSCHs and the second quantity of SPS PDSCHs whose quantity is larger, as the SPS PDSCHs for transmitting or receiving data.

In the present application, firstly, whether the maximum quantities of SPS PDSCHs that the terminal supports to receive under the two capabilities is the same. If yes, the SPS PDSCHs for transmitting or receiving data is determined based on the capability of the FDM multiplexing mode only in the foregoing embodiments. if the maximum quantities are different, the SPS PDSCHs for transmitting or receiving data determined by the terminal for the TDM multiplexing mode are further obtained. For details regarding such obtaining, reference may be made to the method for determining SPS PDSCHs for transmitting or receiving data by the UE for the unicast TDM multiplexing scenario in related 5G R16 standard, which will not be described in detail herein.

In a case that the second quantity of SPS PDSCHs for transmitting or receiving data determined by the UE for the TDM multiplexing mode is more than the first quantity of SPS PDSCHs for transmitting or receiving data determined by the UE for the FDM multiplexing mode, the SPS PDSCHs for transmitting or receiving data determined by the UE for the TDM multiplexing mode are used as the final SPS PDSCHs for transmitting or receiving data.

In a case that the second quantity of SPS PDSCHs for transmitting or receiving data determined by the UE for the TDM multiplexing mode is less than the first quantity of SPS PDSCHs for transmitting or receiving data determined by the UE for the FDM multiplexing mode, the SPS PDSCHs for transmitting or receiving data determined by the UE in the FDM multiplexing mode are used as the final SPS PDSCHs for transmitting or receiving data.

Figure 7:
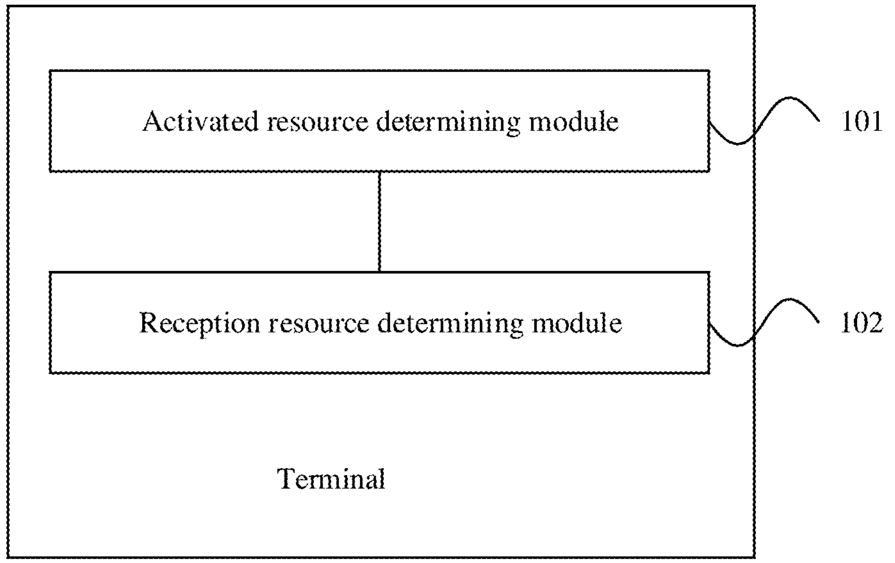
FIG. 7 is a schematic structural diagram of a terminal according to an embodiment of the present application.

An embodiment of the present application provides a terminal. As shown in FIG. 7, the terminal may include: an activated resource determining module 101 and a reception resource determining module 102.

The activated resource determining module 101 is configured to determine SPS PDSCHs activated by a base station in a slot, where the SPS PDSCHs include a first SPS PDSCH set of SPS PDSCHs for carrying unicast service, and/or a second SPS PDSCH set of SPS PDSCHs for carrying broadcast/multicast service.

The reception resource determining module 102 is configured to determine SPS PDSCHs for transmitting or receiving data based on types of services carried by the activated SPS PDSCHs and a PDSCH reception capability supported by a terminal.

The PDSCH reception capability supported by the terminal includes a capability of a frequency division multiplexing (FDM) multiplexing mode that the terminal determines to support.

The terminal provided by the embodiment of the present application specifically executes processes of the above method embodiments, and for details, reference is made to the content of the above embodiments about the method for determining the SPS PDSCH.

Specifically, the capability of the frequency division multiplexing (FDM) multiplexing mode that the terminal determines to support may include: a capability to support determining, in SPS PDSCHs of the activated SPS PDSCHs that have an FDM relationship, a type of service carried by an SPS PDSCH for transmitting or receiving data, and the quantity of SPS PDSCHs corresponding to each type.

For example, the capability of the FDM multiplexing mode that the terminal determines to support may include: a capability to support determining, from SPS PDSCHs of the activated SPS PDSCHs that have an FDM relationship, one SPS PDSCH for carrying unicast service and at most (n−1) SPS PDSCHs for carrying broadcast/multicast service, as SPS PDSCHs for transmitting or receiving data, where n is the maximum quantity of FDM-ed SPS PDSCHs used by the terminal to transmit and/or receive data in the set of SPS PDSCHs having the FDM relationship.

The reception resource determining module 102 may include a priority determining module and a channel determining module.

In an embodiment of the present application, the priority determining module may be configured to determine priorities of the activated SPS PDSCHs. The channel determining module may be configured to determine the SPS PDSCHs for transmitting or receiving data based on an order of the priorities of the activated SPS PDSCHs from high to low, the types of the services carried by the activated SPS PDSCHs and the PDSCH reception capability supported by the terminal.

In another embodiment of the present application, the priority determining module may be configured to determine a priority of each of the SPS PDSCHs in the first SPS PDSCH set and a priority of each of the SPS PDSCHs in the second SPS PDSCH set. The channel determining module may be configured to determine a first candidate SPS PDSCH(s) for transmitting or receiving data from the first SPS PDSCH set, according to the priority of each of the SPS PDSCHs in the first SPS PDSCH set and the PDSCH reception capability supported by the terminal; determine a second candidate SPS PDSCH(s) for transmitting or receiving data from the second SPS PDSCH set, according to the priority of each of the SPS PDSCHs in the second SPS PDSCH set and the PDSCH reception capability supported by the terminal; and determine the SPS PDSCHs for transmitting or receiving data from the first candidate SPS PDSCH(s) for transmitting or receiving data and the second candidate SPS PDSCH(s) for transmitting or receiving data.

In the embodiment of the present application, the terminal may not only support FDM multiplexing, but also support TDM multiplexing.

For example, the maximum quantity of SPS PDSCHs that the terminal supports to receive under the FDM multiplexing mode may be referred to as a first maximum quantity.

The channel determining module may be configured to determine SPS PDSCHs for transmitting or receiving data from the activated SPS PDSCHs, based on the order of the priorities of the activated SPS PDSCHs from high to low, the types of the services carried by the activated SPS PDSCHs and the capability of the FDM multiplexing mode that the terminal determines to support, until the determined SPS PDSCHs for transmitting or receiving data satisfy the first maximum quantity of received SPS PDSCHs supported by the terminal.

Specifically, the priority determining module may be further configured to determine priorities of all the SPS PDSCHs in the first candidate SPS PDSCH(s) and the second candidate SPS PDSCH(s). The channel determining module may be further configured to determine a quantity of SPS PDSCHs for transmitting or receiving data based on an order of the priorities of all the SPS PDSCHs in the first candidate SPS PDSCH(s) and the second candidate SPS PDSCH(s) from high to low, where the quantity of the determined SPS PDSCHs does not exceed the first maximum quantity.

In an embodiment of the present application, there is no overlapping between the determined SPS PDSCHs for transmitting or receiving data in frequency domain. In a case that there is at least one set of SPS PDSCHs that overlap in time domain in SPS PDSCHs determined to be used for transmitting or receiving data, one SPS PDSCH for carrying unicast service and at most (n−1) SPS PDSCHs for carrying broadcast/multicast service included in the at least one set of SPS PDSCHs that overlap in the time domain may be determined as SPS PDSCHs for transmitting or receiving data.

The capability of the FDM multiplexing mode that the terminal determines to support may further specifically include: a capability to: support determining, in SPS PDSCHs of the activated SPS PDSCHs that have the FDM relationship, one SPS PDSCH for carrying unicast service and at most (n−1) SPS PDSCHs for carrying broadcast/multicast service as SPS PDSCHs for transmitting or receiving data, or support determining, in SPS PDSCHs of the activated SPS PDSCHs that have the FDM relationship, at most n SPS PDSCHs for carrying broadcast/multicast service as SPS PDSCHs for transmitting or receiving data, where n is a maximum multiplexing quantity that the terminal determines to support among one set of SPS PDSCHs that overlap in time domain and/or frequency domain.

The reception resource determining module 102 may be configured to: determine priorities of the activated SPS PDSCHs; and determine the SPS PDSCHs for transmitting or receiving data based on an order of the priorities of the activated SPS PDSCHs from high to low, the types of the services carried by the activated SPS PDSCHs and the PDSCH reception capability supported by the terminal.

Specifically, the reception resource determining module 102 may be configured to: in a case that a currently traversed SPS PDSCH determined based on the order is a unicast SPS PDSCH, delete, from a set of the activated SPS PDSCHs, an SPS PDSCH that overlaps with the currently traversed SPS PDSCH in the time domain; and the reception resource determining module 102 may be configured to: in a case that the currently traversed SPS PDSCH determined based on the order is a multicast SPS PDSCH, and a sum of the quantity of the currently traversed SPS PDSCH and the quantity of SPS PDSCHs, which have been determined to be used for transmitting or receiving data and have the FDM relationship with the currently traversed SPS PDSCH, exceeds the first maximum quantity, determine the currently traversed SPS PDSCH not to be an SPS PDSCH for transmitting or receiving data, and delete the currently traversed SPS PDSCH from the set of the activated SPS PDSCHs.

The PDSCH reception capability supported by the terminal may further include: a capability of a time division multiplexing (TDM) multiplexing mode that the terminal determines to support, and a second maximum quantity of SPS PDSCHs that the terminal supports to receive in the TDM multiplexing mode.

The reception resource determining module 102 may be configured to: obtain SPS PDSCHs for transmitting or receiving data determined by the terminal for the TDM multiplexing mode, in a case that the first maximum quantity is different from the second maximum quantity. The reception resource determining module 102 may be configured to: based on a second quantity of SPS PDSCHs for transmitting or receiving data determined by the terminal for the TDM multiplexing mode, and a first quantity of SPS PDSCHs for transmitting or receiving data determined by the terminal for the FDM multiplexing mode, determine one of the first quantity of SPS PDSCHs and second quantity of SPS PDSCHs whose quantity is larger, as the SPS PDSCHs for transmitting or receiving data.

In the terminal provided by the embodiments of the present application the SPS PDSCHs activated by the base station in a slot may be determined, where the SPS PDSCHs include the first SPS PDSCH set for carrying unicast service and/or the second SPS PDSCH set for carrying broadcast/multicast service. In this way, it is supported that multiple types of SPS PDSCHs can be determined to be used for transmitting or receiving data. By determining the SPS PDSCHs for transmitting and receiving data based on the types of services carried by the activated SPS PDSCHs, and the PDSCH reception capability supported by the terminal (for example, the capability of the frequency division multiplexing (FDM) multiplexing mode that is supported and determined by the terminal), a manner for determining survivor PDSCHs in a case that the FDM multiplexing mode for PDSCH is supported is provided. This can ensure the terminal to receive SPS PDSCHs correctly and effectively, thereby saving air interface resources and improving user experience.

Figure 8:
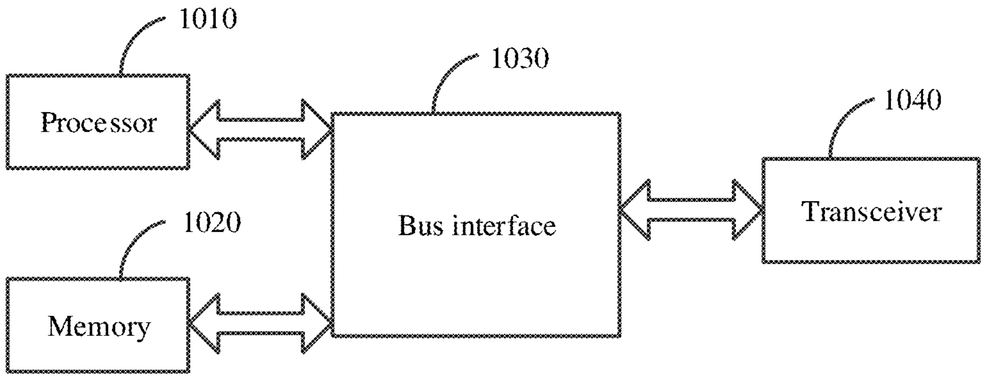
FIG. 8 is a schematic structural diagram of an apparatus for determining SPS PDSCH according to an embodiment of the present application.

As shown in FIG. 8, an embodiment of the present application further provides an apparatus for determining SPS PDSCH, including a memory 1020, a transceiver 1040 and a processor 1010.

The memory 1020 is configured to store a computer program.

The transceiver 1040 is configured to receive and transmit data under the control of the processor 1010.

The processor 1010 is configured to read the computer program in the memory 1020 to perform the following operations: determining SPS PDSCHs activated by a base station in a slot, where the SPS PDSCHs include a first SPS PDSCH set of SPS PDSCHs for carrying unicast service, and/or a second SPS PDSCH set of SPS PDSCHs for carrying broadcast/multicast service; and determining SPS PDSCHs for transmitting or receiving data based on types of services carried by the activated SPS PDSCHs and a PDSCH reception capability supported by a terminal.

The capability of the frequency division multiplexing (FDM) mode that the terminal determines to support may include: a capability to support determining, in SPS PDSCHs of the activated SPS PDSCHs that have an FDM relationship, types of services carried by the SPS PDSCHs for transmitting or receiving data, and the quantity of SPS PDSCHs corresponding to each of the types.

For example, the capability of the FDM multiplexing mode that the terminal determines to support may include: a capability to support determining, from SPS PDSCHs of the activated SPS PDSCHs that have an FDM relationship, one SPS PDSCH for carrying unicast service and at most (n−1) SPS PDSCHs for carrying broadcast/multicast service, as SPS PDSCHs for transmitting or receiving data, where n is the maximum quantity of FDM-ed SPS PDSCHs used by the terminal to transmit and/or receive data among one set of SPS PDSCHs having the FDM relationship.

In the embodiment of the present application, the processor 1010 may be specifically configured to perform the following operations: determining priorities of the activated SPS PDSCHs; and determining the SPS PDSCHs for transmitting or receiving data based on an order of the priorities of the activated SPS PDSCHs in according with from high to low, the types of the services carried by the activated SPS PDSCHs and the PDSCH reception capability supported by the terminal.

In another embodiment of the present application, the processor 1010 may be specifically configured to perform the following operations: determining a priority of each of the SPS PDSCHs in the first SPS PDSCH set and a priority of each of the SPS PDSCHs in the second SPS PDSCH set; determining a first candidate SPS PDSCH(s) for transmitting or receiving data from the first SPS PDSCH set, according to the priority of each of the SPS PDSCHs in the first SPS PDSCH set and the PDSCH reception capability supported by the terminal; determining a second candidate SPS PDSCH(s) for transmitting or receiving data from the second SPS PDSCH set, according to the priority of each of the SPS PDSCHs in the second SPS PDSCH set and the PDSCH reception capability supported by the terminal; and determining the SPS PDSCHs for transmitting or receiving data from the first candidate SPS PDSCH(s) for transmitting or receiving data and the second candidate SPS PDSCH(s) for transmitting or receiving data.

The PDSCH reception capability supported by the terminal may further include: a first maximum quantity of SPS PDSCHs that the terminal supports to receive under the FDM multiplexing mode. In this case, the processor 1010 may be specifically configured to perform the following operations: determining the SPS PDSCHs for transmitting or receiving data from the activated SPS PDSCHs, based on an order of the priorities of the activated SPS PDSCHs from high to low, the types of the services carried by the activated SPS PDSCHs and the capability of the FDM multiplexing mode that the terminal determines to support, until the determined SPS PDSCHs for transmitting or receiving data satisfy the first maximum quantity of SPS PDSCHs that the terminal supports to receive.

Specifically, the processor 1010 may be configured to perform the following operations: determining priorities of all the SPS PDSCHs in the first candidate SPS PDSCH(s) and the second candidate SPS PDSCH(s); and determining a quantity of SPS PDSCHs for transmitting or receiving data based on an order of the priorities of all the SPS PDSCHs in the first candidate SPS PDSCH(s) and the second candidate SPS PDSCH(s) from high to low, where the quantity of the determined SPS PDSCHs does not exceed the first maximum quantity.

In an embodiment of the present application, there is no overlapping between the determined SPS PDSCHs for transmitting or receiving data in frequency domain. In a case that there is at least one set of SPS PDSCHs having overlapping in the time domain in SPS PDSCHs determined for transmitting or receiving data, one SPS PDSCH for carrying unicast service and at most (n−1) SPS PDSCHs for carrying broadcast/multicast service included in the at least one set of SPS PDSCHs having overlapping in the time domain may be determined as SPS PDSCHs for transmitting or receiving data.

The capability of the FDM multiplexing mode that the terminal determines to support may further specifically include: a capability to support determining, in SPS PDSCHs of the activated SPS PDSCHs that have the FDM relationship, one SPS PDSCH for carrying unicast service and at most (n−1) SPS PDSCHs for carrying broadcast/multicast service as SPS PDSCHs for transmitting or receiving data, or a capability to support determining, in SPS PDSCHs of the activated SPS PDSCHs that have the FDM relationship, at most n SPS PDSCHs for carrying broadcast/multicast service as SPS PDSCHs for transmitting or receiving data, where n is a maximum multiplexing quantity the terminal determines to support among one set of SPS PDSCHs having overlapping in time domain and/or frequency domain.

The processor 1010 may be configured to perform the following operations: determining priorities of the activated SPS PDSCHs; and determining the SPS PDSCHs for transmitting or receiving data based on an order of the priorities of the activated SPS PDSCHs from high to low, the types of the services carried by the activated SPS PDSCHs and the PDSCH reception capability supported by the terminal.

Specifically, the processor 1010 may be configured to perform the following operations: in a case that a currently traversed SPS PDSCH determined based on the order is a unicast SPS PDSCH, deleting, from a set of the activated SPS PDSCHs, an SPS PDSCH that overlaps with the currently traversed SPS PDSCH in the time domain; and in a case that the currently traversed SPS PDSCH determined based on the order is a multicast SPS PDSCH, and a sum of the quantity of the currently traversed SPS PDSCH and the quantity of SPS PDSCHs, which have been determined to be used for transmitting or receiving data and have the FDM relationship with the currently traversed SPS PDSCH, exceeds the first maximum quantity, determining the currently traversed SPS PDSCH not to be an SPS PDSCH for transmitting or receiving data, and deleting, from the set of the activated SPS PDSCHs, the currently traversed SPS PDSCH.

In the embodiment of the present application, the PDSCH reception capability supported by the terminal may further include: a capability of a time division multiplexing (TDM) multiplexing mode that the terminal determines to support, and a second maximum quantity of SPS PDSCHs that the terminal supports to receive in the TDM multiplexing mode.

In this case, the processor 1010 may be further configured to perform the following operations: in a case that the first maximum quantity is different from the second maximum quantity obtaining SPS PDSCHs for transmitting or receiving data determined by the terminal in the TDM multiplexing mode; and based on a second quantity of SPS PDSCHs for transmitting or receiving data determined by the terminal for the TDM multiplexing mode, and a first quantity of SPS PDSCHs for transmitting or receiving data determined by the terminal for the FDM multiplexing mode, determining one of the first quantity of SPS PDSCHs and the second quantity of SPS PDSCHs whose quantity is larger, as the SPS PDSCHs for transmitting or receiving data.

In FIG. 8, the bus architecture may include any quantity of interconnected buses and bridges. Specifically, various circuits of one or more processors 1010 represented by the processor 1010 and a memory 1020 represented by the memory 1020 are linked together. The bus architecture may also link various other circuits such as peripheral devices, voltage regulators, power management circuits, etc., which are well-known in the art, and therefore, the embodiments of present application will not provide further descriptions. The apparatus for determining SPS PDSCH may further include a bus interface 1030 providing an interface. The transceiver 1040 may be a plurality of elements, that is, include a transmitter and a receiver, and provide a unit for communicating with various other devices on a transmission medium. The transmission medium includes a wireless channel, a wired channel, an optical cable. The processor 1010 is responsible for managing the bus architecture and general processing, and the memory 1020 may store data used by the processor 1010 when performing operations.

The processor 1010 may be a central processing device (CPU), an application specific integrated circuit (Application Specific Integrated Circuit, ASIC), a field programmable gate array (Field Programmable Gate Array, FPGA), or a complex programmable logic device (Complex Programmable Logic Device, CPLD). The processor 1010 may also adopt a multi-core architecture.

The processor 1010 is configured to execute any method for determining the SPS PDSCH provided in the embodiments of the present application according to obtained executable instructions by calling the computer program stored in the memory 1020. The processor 1010 and the memory 1020 may also be separated physically.

An embodiment of the present application provides an electronic device, which includes: a memory and a processor. At least one program is stored in the memory, and when the program is executed by the processor, the following advantages can be achieved as compared with the related art: by determining the SPS PDSCHs activated by the base station in a slot, where the SPS PDSCHs includes the first SPS PDSCH set for carrying unicast service and/or the second SPS PDSCH set for carrying broadcast/multicast service, it is enabled that multiple types of SPS PDSCHs may be determined to be used for transmitting or receiving data. By determining the SPS PDSCHs for transmitting and receiving data based on the types of services carried by the activated SPS PDSCHs, and the PDSCH reception capability supported by the terminal (for example, the capability of the frequency division multiplexing (FDM) multiplexing mode that is supported and determined by the terminal), a manner for determining survivor PDSCHs in a case that the FDM multiplexing mode for PDSCH is supported is provided. This can ensure the terminal to receive SPS PDSCHs correctly and effectively, thereby saving air interface resources and improving user experience.

Figure 9:
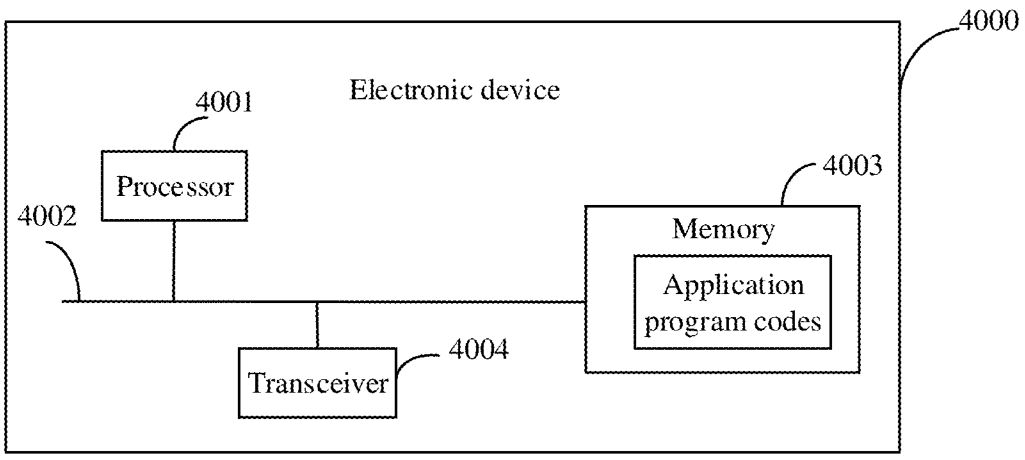
FIG. 9 is a schematic structural diagram of an electronic device according to an embodiment of the present application.

An electronic device is provided in an optional embodiment, as shown in FIG. 9, the electronic device 4000 shown in FIG. 9 includes: a processor 4001 and a memory 4003. The processor 4001 is connected to the memory 4003, such as connecting through a bus 4002. Optionally, the electronic device 4000 may further include a transceiver 4004. It should be noted that, in practical applications, the quantity of transceiver 4004 is not limited to one. The structure of the electronic device 4000 does not construct as limiting the embodiments of the present application.

Processor 4001 may be a central processing unit (Central Processing Unit, CPU), a general-purpose processor, a digital signal processor (Digital Signal Processor, DSP), an application specific integrated circuit (Application Specific Integrated Circuit, ASIC), a field programmable gate array (Field Programmable Gate Array, FPGA) or other programmable logic devices, a transistor logic device, a hardware component, or any combination thereof. The processor 4001 may implement or execute various exemplary logical blocks, modules and circuits described in the contents disclosed by the present application. The processor 4001 may also be a combination that implements computing functions, for example, a combination of one or more microprocessors, a combination of a DSP and a microprocessor, and the like.

The bus 4002 may include a path to transfer information between the components described above. The bus 4002 may be a peripheral component interconnect (Peripheral Component Interconnect, PCI) bus, or an extended industry standard architecture (Extended Industry Standard Architecture, EISA) bus or the like. The bus 4002 may be divided into address bus, data bus, control bus and the like. For ease of representation, only one thick line is used in FIG. 9, but it does not mean that there is only one bus or one type of bus.

The memory 4003 may be read only memory (Read Only Memory, ROM) or other types of static storage devices that can store static information and instructions, random access memory (Random Access Memory, RAM) or other types of dynamic storage devices that can store information and instructions, may also be electrically erasable programmable read only memory (Electrically Erasable Programmable Read Only Memory, EEPROM), compact disc read only memory (Compact Disc Read Only Memory, CD-ROM) or other optical disc storage, optical disc storage (including compression optical disc, laser disc, optical disc, digital versatile disc, blue-ray disc, etc.), magnetic disk storage medium or other magnetic storage devices, or any other medium that can be used to carry or store desired program code in the form of instructions or data structures and can be accessed by a computer, but not limited thereto.

The memory 4003 is configured to store application program codes for executing the solutions of the present application which is controlled to be executed by the processor 4001. The processor 4001 is configured to execute the application program codes stored in the memory 4003 to implement the solution as described in the foregoing method embodiments.

An embodiment of the present application provides a computer-readable storage medium. The computer-readable storage medium stores a computer program, which, when running on a computer, causes the computer to execute the corresponding solution as described in the foregoing method embodiments. Compared with the related art, by determining the SPS PDSCHs activated by the base station in a slot, where the SPS PDSCHs includes the first SPS PDSCH set for carrying unicast service and/or the second SPS PDSCH set for carrying broadcast/multicast service, it is enabled that multiple types of SPS PDSCHs may be determined to be used for transmitting or receiving data. By determining the SPS PDSCHs for transmitting and receiving data based on the types of services carried by the activated SPS PDSCHs, and the PDSCH reception capability supported by the terminal (for example, the capability of the frequency division multiplexing (FDM) multiplexing mode that is supported and determined by the terminal), a manner for determining survivor PDSCHs in a case that the FDM multiplexing mode for PDSCH is supported is provided. This can ensure the terminal to receive SPS PDSCHs correctly and effectively, thereby saving air interface resources and improving user experience.

An embodiment of the present application provides a computer program. The computer program includes computer instructions, the computer instructions are stored in a computer-readable storage medium. When a processor of a computer device reads the computer instructions from the computer-readable storage medium, the processor is configured to execute the computer instructions, and cause the computer device to execute the solution as described in the foregoing method embodiments. Compared with the related art, by determining the SPS PDSCHs activated by the base station in a slot, where the SPS PDSCHs includes the first SPS PDSCH set for carrying unicast service and/or the second SPS PDSCH set for carrying broadcast/multicast service, it is enabled that multiple types of SPS PDSCHs may be determined to be used for transmitting or receiving data. By determining the SPS PDSCHs for transmitting and receiving data based on the types of services carried by the activated SPS PDSCHs, and the PDSCH reception capability supported by the terminal (for example, the capability of the frequency division multiplexing (FDM) multiplexing mode that is supported and determined by the terminal), a manner for determining survivor PDSCHs in a case that the FDM multiplexing mode for PDSCH is supported is provided. This can ensure the terminal to receive SPS PDSCHs correctly and effectively, thereby saving air interface resources and improving user experience.

It should be understood that, although multiple steps in the flowchart of the accompanying drawings are linked sequentially according to arrows, these steps are not necessarily executed sequentially in the order indicated by the arrows. Unless otherwise specified herein, there is no strict order restriction on the execution of these steps, and they may be executed in other orders. Moreover, at least some of the steps in the flowchart of the accompanying drawings may include multiple sub-steps or multiple stages, and these sub-steps or stages are not necessarily executed at the same time, but may be executed at different times, and the order of execution is also not necessarily performed sequentially, but may be performed in turn or alternately with at least a part of other steps, or sub-steps or stages of other steps.

The above embodiments are only some implementations of the present application. It should be pointed out that those of ordinary skill in the art can make some improvements and modifications without departing from the principle of the present application, and these improvements and modifications shall also fall within the scope of present application.

What is claimed is:

1. A method for determining semi-persistent scheduling (SPS) physical downlink shared channel (PDSCH), performed by a terminal and comprising:

determining SPS PDSCHs activated by a base station in a slot, wherein the SPS PDSCHs include a first SPS PDSCH set of SPS PDSCHs for carrying unicast service and/or a second SPS PDSCH set of SPS PDSCHs for carrying broadcast/multicast service; and determining, based on type of services carried by the activated SPS PDSCHs and a PDSCH reception capability supported by the terminal, SPS PDSCHs for transmitting or receiving data, wherein the PDSCH reception capability supported by the terminal includes a capability of a supported frequency division multiplexing (FDM) multiplexing mode determined by the terminal;

wherein the capability of the supported FDM multiplexing mode comprises one of:

a first capability to support determining, in SPS PDSCHs of the activated SPS PDSCHs that have an FDM relationship, one SPS PDSCH for carrying unicast service and at most (n-1) SPS PDSCHs for carrying broadcast/multicast service, as SPS PDSCHs for transmitting or receiving data; wherein n is a maximum quantity of multiplexed SPS PDSCHs for transmitting or receiving data by the terminal in a set of SPS PDSCHs having FDM relationship; or a second capability to: support determining, in the SPS PDSCHs of the activated SPS PDSCHs that have the FDM relationship, one SPS PDSCH for carrying unicast service and at most (n-1) SPS PDSCHs for carrying broadcast/multicast service as the SPS PDSCHs for transmitting or receiving data, or support determining, in the SPS PDSCHs of the activated SPS PDSCHs that have the FDM relationship, at most n SPS PDSCHs for carrying broadcast/multicast service as the SPS PDSCHs for transmitting or receiving data, wherein n is a supported maximum multiplexing quantity determined by the terminal in a set of SPS PDSCHs overlapping in time domain and/or frequency domain;

wherein when the capability of the supported FDM multiplexing mode comprises the second capability, the determining, based on type of services carried by the activated SPS PDSCHs and a PDSCH reception capability supported by the terminal, SPS PDSCHs for transmitting or receiving data comprises:

determining priorities of the activated SPS PDSCHs; and determining, based on a high-to-low order of the priorities of the activated SPS PDSCHs, the types of the services carried by the activated SPS PDSCHs and the PDSCH reception capability supported by the terminal, the SPS PDSCHs for transmitting or receiving data; and wherein the PDSCH reception capability supported by the terminal further comprises: a first maximum quantity of SPS PDSCHs that the terminal supports to receive under the FDM multiplexing mode; and the determining, based on a high-to-low order of the priorities of the activated SPS PDSCHs, the types of the services carried by the activated SPS PDSCHs and the PDSCH reception capability supported by the terminal, the SPS PDSCHs for transmitting or receiving data comprises:

in a case that a currently traversed SPS PDSCH determined according to the order is a unicast SPS PDSCH, deleting, from a set of the activated SPS PDSCHs, an SPS PDSCH that overlaps with the currently traversed SPS PDSCH in time domain; and in a case that a currently traversed SPS PDSCH determined according to the order is a multicast SPS PDSCH, and that a sum of the quantity of the currently traversed SPS PDSCH and the quantity of SPS PDSCHs, which have been determined to be used for transmitting or receiving data and have the FDM relationship with the currently traversed SPS PDSCH, exceeds the first maximum quantity, determining the currently traversed SPS PDSCH not to be an SPS PDSCH for transmitting or receiving data, and deleting the currently traversed SPS PDSCH from the set of the activated SPS PDSCHs.

2. The method according to claim 1, wherein when the capability of the supported FDM multiplexing mode comprises the first capability, the determining, based on type of services carried by the activated SPS PDSCHs and a PDSCH reception capability supported by the terminal, SPS PDSCHs for transmitting or receiving data comprises:

determining priorities of the activated SPS PDSCHs; and determining, based on a high-to-low order of the priorities of the activated SPS PDSCHs, the types of the services carried by the activated SPS PDSCHs and the PDSCH reception capability supported by the terminal, the SPS PDSCHs for transmitting or receiving data.

3. The method according to claim 2, wherein the PDSCH reception capability supported by the terminal further comprises: a first maximum quantity of SPS PDSCHs that the terminal supports to receive under the FDM multiplexing mode; and the determining, based on a high-to-low order of the priorities of the activated SPS PDSCHs, the types of the services carried by the activated SPS PDSCHs and the PDSCH reception capability supported by the terminal, the SPS PDSCHs for transmitting or receiving data comprises:

determining, from the activated SPS PDSCHs based on the high-to-low order of the priorities of the activated SPS PDSCHs, the types of the services carried by the activated SPS PDSCHs and the capability of the supported FDM multiplexing mode determined by the terminal, SPS PDSCHs for transmitting or receiving data until the determined SPS PDSCHs for transmitting or receiving data satisfy the first maximum quantity of SPS PDSCHs that the terminal supports to receive.

4. The method according to claim 3, wherein the PDSCH reception capability supported by the terminal comprises: a capability of a supported time division multiplexing (TDM) multiplexing mode determined by the terminal, and a second maximum quantity of SPS PDSCHs that the terminal supports to receive in the TDM multiplexing mode;

wherein the determining the SPS PDSCHs for transmitting or receiving data further comprises:

in a case that the first maximum quantity is different from the second maximum quantity, obtaining SPS PDSCHs for transmitting or receiving data determined by the terminal for the TDM multiplexing mode; and based on a second quantity of SPS PDSCHs for transmitting or receiving data determined by the terminal for the TDM multiplexing mode, and a first quantity of SPS PDSCHs for transmitting or receiving data determined by the terminal for the FDM multiplexing mode, determining one of the second quantity of SPS PDSCHs and the first quantity of SPS PDSCHs whose quantity is larger, as the SPS PDSCHs for transmitting or receiving data.

5. The method according to claim 2, wherein the determined SPS PDSCHs for transmitting or receiving data does not overlap with each other in frequency domain;

in a case that there is at least one set of SPS PDSCHs overlapping in time domain in SPS PDSCHs determined to be used for transmitting or receiving data, one SPS PDSCH for carrying unicast service and at most (n-1) SPS PDSCHs for carrying broadcast/multicast service comprised in the at least one set of SPS PDSCHs overlapping in time domain are determined as SPS PDSCHs for transmitting or receiving data.

6. The method according to claim 1, wherein when the capability of the supported FDM multiplexing mode comprises the first capability, the determining, based on type of services carried by the activated SPS PDSCHs and a PDSCH reception capability supported by the terminal, SPS PDSCHs for transmitting or receiving data comprises:

determining a priority of each of the SPS PDSCHs in the first SPS PDSCH set and a priority of each of the SPS PDSCHs in the second SPS PDSCH set;

determining, from the first SPS PDSCH set based on the priority of each of the SPS PDSCHs in the first SPS PDSCH set and the PDSCH reception capability supported by the terminal, first candidate SPS PDSCHs for transmitting or receiving data;

determining, from the second SPS PDSCH set based on the priority of each of the SPS PDSCHs in the second SPS PDSCH set and the PDSCH reception capability supported by the terminal, second candidate SPS PDSCHs for transmitting or receiving data; and determining the SPS PDSCHs for transmitting or receiving data from the first candidate SPS PDSCHs for transmitting or receiving data and the second candidate SPS PDSCHs for transmitting or receiving data.

7. The method according to claim 6, wherein the PDSCH reception capability supported by the terminal further comprises: a first maximum quantity of SPS PDSCHs that the terminal supports to receive under the FDM multiplexing mode; and wherein the determining the SPS PDSCHs for transmitting or receiving data from the first candidate SPS PDSCHs for transmitting or receiving data and the second candidate SPS PDSCHs for transmitting or receiving data comprises:

determining priorities of each of SPS PDSCHs in the first candidate SPS PDSCHs and the second candidate SPS PDSCHs; and determining, based on a high-to-low order of the priorities of each of the SPS PDSCHs in the first candidate SPS PDSCHs and the second candidate SPS PDSCHs, SPS PDSCHs for transmitting or receiving data, wherein the quantity of the determined SPS PDSCHs does not exceed the first maximum quantity.

8. A terminal, comprising:

a memory, a processor, and a computer program that is stored on the memory and executable on the processor, wherein the processor is configured to execute the computer program to implement:

determining SPS PDSCHs activated by a base station in a slot, wherein the SPS PDSCHs include a first SPS PDSCH set of SPS PDSCHs for carrying unicast service and/or a second SPS PDSCH set of SPS PDSCHs for carrying broadcast/multicast service; and determining, based on type of services carried by the activated SPS PDSCHs and a PDSCH reception capability supported by the terminal, SPS PDSCHs for transmitting or receiving data, wherein the PDSCH reception capability supported by the terminal includes a capability of a supported frequency division multiplexing (FDM) multiplexing mode determined by the terminal;

wherein the capability of the supported FDM multiplexing mode comprises one of:

a first capability to support determining, in SPS PDSCHs of the activated SPS PDSCHs that have an FDM relationship, one SPS PDSCH for carrying unicast service and at most (n-1) SPS PDSCHs for carrying broadcast/multicast service, as SPS PDSCHs for transmitting or receiving data; wherein n is a maximum quantity of multiplexed SPS PDSCHs for transmitting or receiving data by the terminal in a set of SPS PDSCHs having FDM relationship; or a second capability to: support determining, in the SPS PDSCHs of the activated SPS PDSCHs that have the FDM relationship, one SPS PDSCH for carrying unicast service and at most (n-1) SPS PDSCHs for carrying broadcast/multicast service as the SPS PDSCHs for transmitting or receiving data, or support determining, in the SPS PDSCHs of the activated SPS PDSCHs that have the FDM relationship, at most n SPS PDSCHs for carrying broadcast/multicast service as the SPS PDSCHs for transmitting or receiving data, wherein n is a supported maximum multiplexing quantity determined by the terminal in a set of SPS PDSCHs overlapping in time domain and/or frequency domain;

wherein when the capability of the supported FDM multiplexing mode comprises the second capability, the determining, based on type of services carried by the activated SPS PDSCHs and a PDSCH reception capability supported by the terminal, SPS PDSCHs for transmitting or receiving data comprises:

determining priorities of the activated SPS PDSCHs; and determining, based on a high-to-low order of the priorities of the activated SPS PDSCHs, the types of the services carried by the activated SPS PDSCHs and the PDSCH reception capability supported by the terminal, the SPS PDSCHs for transmitting or receiving data; and wherein the PDSCH reception capability supported by the terminal further comprises: a first maximum quantity of SPS PDSCHs that the terminal supports to receive under the FDM multiplexing mode; and the determining, based on a high-to-low order of the priorities of the activated SPS PDSCHs, the types of the services carried by the activated SPS PDSCHs and the PDSCH reception capability supported by the terminal, the SPS PDSCHs for transmitting or receiving data comprises:

in a case that a currently traversed SPS PDSCH determined according to the order is a unicast SPS PDSCH, deleting, from a set of the activated SPS PDSCHs, an SPS PDSCH that overlaps with the currently traversed SPS PDSCH in time domain; and in a case that a currently traversed SPS PDSCH determined according to the order is a multicast SPS PDSCH, and that a sum of the quantity of the currently traversed SPS PDSCH and the quantity of SPS PDSCHs, which have been determined to be used for transmitting or receiving data and have the FDM relationship with the currently traversed SPS PDSCH, exceeds the first maximum quantity, determining the currently traversed SPS PDSCH not to be an SPS PDSCH for transmitting or receiving data, and deleting the currently traversed SPS PDSCH from the set of the activated SPS PDSCHs.

9. A non-transitory computer-readable storage medium, wherein the computer-readable storage medium stores computer instructions for causing a computer to implement:

determining SPS PDSCHs activated by a base station in a slot, wherein the SPS PDSCHs include a first SPS PDSCH set of SPS PDSCHs for carrying unicast service and/or a second SPS PDSCH set of SPS PDSCHs for carrying broadcast/multicast service; and determining, based on type of services carried by the activated SPS PDSCHs and a PDSCH reception capability supported by a terminal, SPS PDSCHs for transmitting or receiving data, wherein the PDSCH reception capability supported by the terminal includes a capability of a supported frequency division multiplexing (FDM) multiplexing mode determined by the terminal;

wherein the capability of the supported FDM multiplexing mode comprises one of a first capability to support determining, in SPS PDSCHs of the activated SPS PDSCHs that have an FDM relationship, one SPS PDSCH for carrying unicast service and at most (n-1) SPS PDSCHs for carrying broadcast/multicast service, as SPS PDSCHs for transmitting or receiving data; wherein n is a maximum quantity of multiplexed SPS PDSCHs for transmitting or receiving data by the terminal in a set of SPS PDSCHs having FDM relationship; or a second capability to: support determining, in the SPS PDSCHs of the activated SPS PDSCHs that have the FDM relationship, one SPS PDSCH for carrying unicast service and at most (n-1) SPS PDSCHs for carrying broadcast/multicast service as the SPS PDSCHs for transmitting or receiving data, or support determining, in the SPS PDSCHs of the activated SPS PDSCHs that have the FDM relationship, at most n SPS PDSCHs for carrying broadcast/multicast service as the SPS PDSCHs for transmitting or receiving data, wherein n is a supported maximum multiplexing quantity determined by the terminal in a set of SPS PDSCHs overlapping in time domain and/or frequency domain;

wherein when the capability of the supported FDM multiplexing mode comprises the second capability, the determining, based on type of services carried by the activated SPS PDSCHs and a PDSCH reception capability supported by the terminal, SPS PDSCHs for transmitting or receiving data comprises:

determining priorities of the activated SPS PDSCHs; and determining, based on a high-to-low order of the priorities of the activated SPS PDSCHs, the types of the services carried by the activated SPS PDSCHs and the PDSCH reception capability supported by the terminal, the SPS PDSCHs for transmitting or receiving data; and wherein the PDSCH reception capability supported by the terminal further comprises: a first maximum quantity of SPS PDSCHs that the terminal supports to receive under the FDM multiplexing mode; and the determining, based on a high-to-low order of the priorities of the activated SPS PDSCHs, the types of the services carried by the activated SPS PDSCHs and the PDSCH reception capability supported by the terminal, the SPS PDSCHs for transmitting or receiving data comprises:

in a case that a currently traversed SPS PDSCH determined according to the order is a unicast SPS PDSCH, deleting, from a set of the activated SPS PDSCHs, an SPS PDSCH that overlaps with the currently traversed SPS PDSCH in time domain; and in a case that a currently traversed SPS PDSCH determined according to the order is a multicast SPS PDSCH, and that a sum of the quantity of the currently traversed SPS PDSCH and the quantity of SPS PDSCHs, which have been determined to be used for transmitting or receiving data and have the FDM relationship with the currently traversed SPS PDSCH, exceeds the first maximum quantity, determining the currently traversed SPS PDSCH not to be an SPS PDSCH for transmitting or receiving data, and deleting the currently traversed SPS PDSCH from the set of the activated SPS PDSCHs.

10. The terminal according to claim 9, wherein when the capability of the supported FDM multiplexing mode comprises the first capability, the determining, based on type of services carried by the activated SPS PDSCHs and a PDSCH reception capability supported by the terminal, SPS PDSCHs for transmitting or receiving data comprises:

determining priorities of the activated SPS PDSCHs; and determining, based on a high-to-low order of the priorities of the activated SPS PDSCHs, the types of the services carried by the activated SPS PDSCHs and the PDSCH reception capability supported by the terminal, the SPS PDSCHs for transmitting or receiving data.

11. The terminal according to claim 9, wherein when the capability of the supported FDM multiplexing mode comprises the first capability, the determining, based on type of services carried by the activated SPS PDSCHs and a PDSCH reception capability supported by the terminal, SPS PDSCHs for transmitting or receiving data comprises:

determining a priority of each of the SPS PDSCHs in the first SPS PDSCH set and a priority of each of the SPS PDSCHs in the second SPS PDSCH set;

determining, from the first SPS PDSCH set based on the priority of each of the SPS PDSCHs in the first SPS PDSCH set and the PDSCH reception capability supported by the terminal, first candidate SPS PDSCHs for transmitting or receiving data;

determining, from the second SPS PDSCH set based on the priority of each of the SPS PDSCHs in the second SPS PDSCH set and the PDSCH reception capability supported by the terminal, second candidate SPS PDSCHs for transmitting or receiving data; and determining the SPS PDSCHs for transmitting or receiving data from the first candidate SPS PDSCHs for transmitting or receiving data and the second candidate SPS PDSCHs for transmitting or receiving data.

* * * * *